United States Patent
Tanaka et al.

(10) Patent No.: US 11,175,784 B2
(45) Date of Patent: *Nov. 16, 2021

(54) TOUCH PANEL DRIVING CIRCUIT

(71) Applicant: Japan Display Inc., Tokyo (JP)

(72) Inventors: Toshihiko Tanaka, Tokyo (JP); Naoki Takada, Tokyo (JP); Chihiro Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/089,971

(22) Filed: Nov. 5, 2020

(65) Prior Publication Data

US 2021/0055833 A1    Feb. 25, 2021

Related U.S. Application Data

(63) Continuation of application No. 16/157,774, filed on Oct. 11, 2018, now Pat. No. 10,831,306.

(30) Foreign Application Priority Data

Oct. 18, 2017  (JP) .............................. JP2017-201712

(51) Int. Cl.
*G06F 3/044* (2006.01)
*G06F 3/041* (2006.01)

(52) U.S. Cl.
CPC ............ *G06F 3/0446* (2019.05); *G06F 3/044* (2013.01); *G06F 3/0412* (2013.01); *G06F 3/0416* (2013.01); *G06F 3/04164* (2019.05); *G06F 3/04166* (2019.05); *G06F 2203/04102* (2013.01); *G06F 2203/04107* (2013.01)

(58) Field of Classification Search
CPC .............. G06F 3/0416; G06F 3/04166; G06F 3/04164; G06F 3/044; G06F 3/0412; G06F 2203/04102; G06F 2203/04107
See application file for complete search history.

(56) References Cited

U.S. PATENT DOCUMENTS

| | | | | |
|---|---|---|---|---|
| 8,947,393 | B2 * | 2/2015 | Hwang | ................... G06F 3/047 345/174 |
| 9,811,147 | B2 * | 11/2017 | Komatsu | ............. G06F 3/04184 |
| 10,558,315 | B2 * | 2/2020 | Wang | .................... H01L 27/323 |
| 10,684,712 | B2 * | 6/2020 | Katsuta | ................. G06F 3/0412 |

(Continued)

FOREIGN PATENT DOCUMENTS

| JP | 2002-244614 | | 8/2002 |
|---|---|---|---|
| JP | 2011-221938 | A | 11/2011 |
| JP | 2014-199605 | | 10/2014 |

OTHER PUBLICATIONS

Japanese Office Action dated Oct. 5, 2021 in corresponding Japanese Application No. 2017-201712.

*Primary Examiner* — Amy Onyekaba
(74) *Attorney, Agent, or Firm* — K&L Gates LLP

(57) ABSTRACT

A touch panel driving circuit is provided and includes a plurality of output circuits each outputting a driving signal, respectively; a power supply line connected to a power of the plurality of output circuits; a power supply circuit; and a resistor element that is provided in common for the plurality of output circuits and is different from a resistance of the power supply line, wherein the power of the plurality of output circuits is connected to the power supply circuit through the resistor element and the power supply line.

7 Claims, 23 Drawing Sheets

(56) References Cited

U.S. PATENT DOCUMENTS

| | | | |
|---|---|---|---|
| 2006/0033016 A1* | 2/2006 | Ogawa | G06F 3/0421 250/221 |
| 2006/0232506 A1* | 10/2006 | Jeong | G09G 3/2927 345/60 |
| 2009/0314551 A1* | 12/2009 | Nakajima | G06F 3/045 178/18.05 |
| 2011/0254801 A1* | 10/2011 | Gettemy | G06F 1/1626 345/173 |
| 2012/0113048 A1* | 5/2012 | Hwang | G06F 3/047 345/174 |
| 2013/0181748 A1* | 7/2013 | Zajc | H03K 17/302 327/109 |
| 2014/0132161 A1* | 5/2014 | Zhang | H05B 45/46 315/161 |
| 2014/0292709 A1* | 10/2014 | Mizuhashi | G06F 3/0445 345/174 |
| 2014/0333583 A1* | 11/2014 | Fujita | G06F 3/045 345/174 |
| 2014/0362042 A1* | 12/2014 | Noguchi | G06F 3/0412 345/174 |
| 2015/0035794 A1* | 2/2015 | Zhitomirskiy | G06F 3/0445 345/174 |
| 2015/0242023 A1* | 8/2015 | Makiuchi | G06F 3/045 345/174 |
| 2015/0268778 A1* | 9/2015 | Okamura | G06F 3/0446 345/173 |
| 2016/0225787 A1* | 8/2016 | Katsuta | H01L 27/0296 |
| 2016/0233878 A1* | 8/2016 | Fuwa | H03M 1/68 |
| 2016/0266687 A1* | 9/2016 | Kim | G06F 3/04182 |
| 2016/0357329 A1* | 12/2016 | Oke | G02F 1/13338 |
| 2017/0212624 A1* | 7/2017 | Katsuta | G06F 3/04166 |
| 2017/0357353 A1 | 12/2017 | Katsuta | |
| 2018/0039363 A1* | 2/2018 | Liu | G01L 1/2281 |

* cited by examiner

F I G. 1
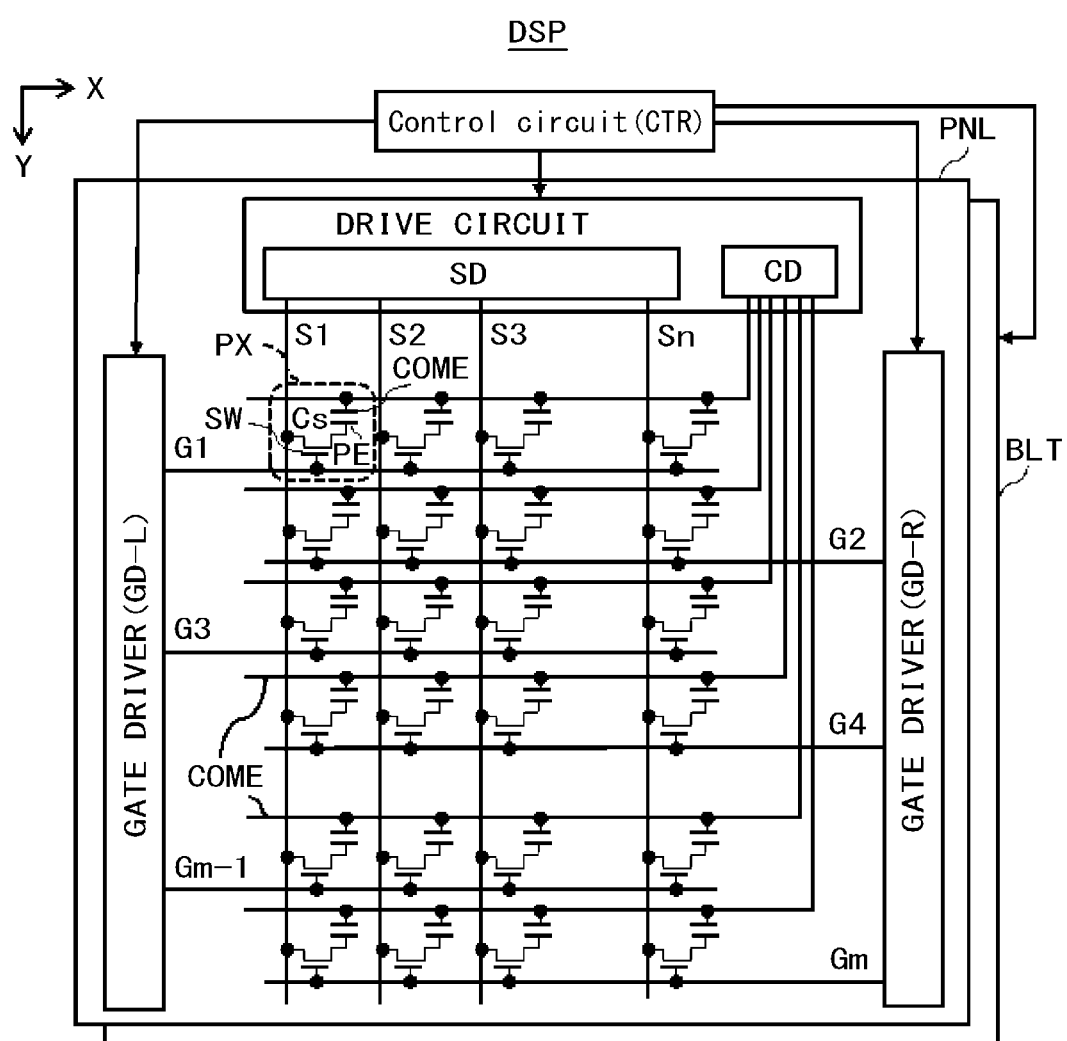

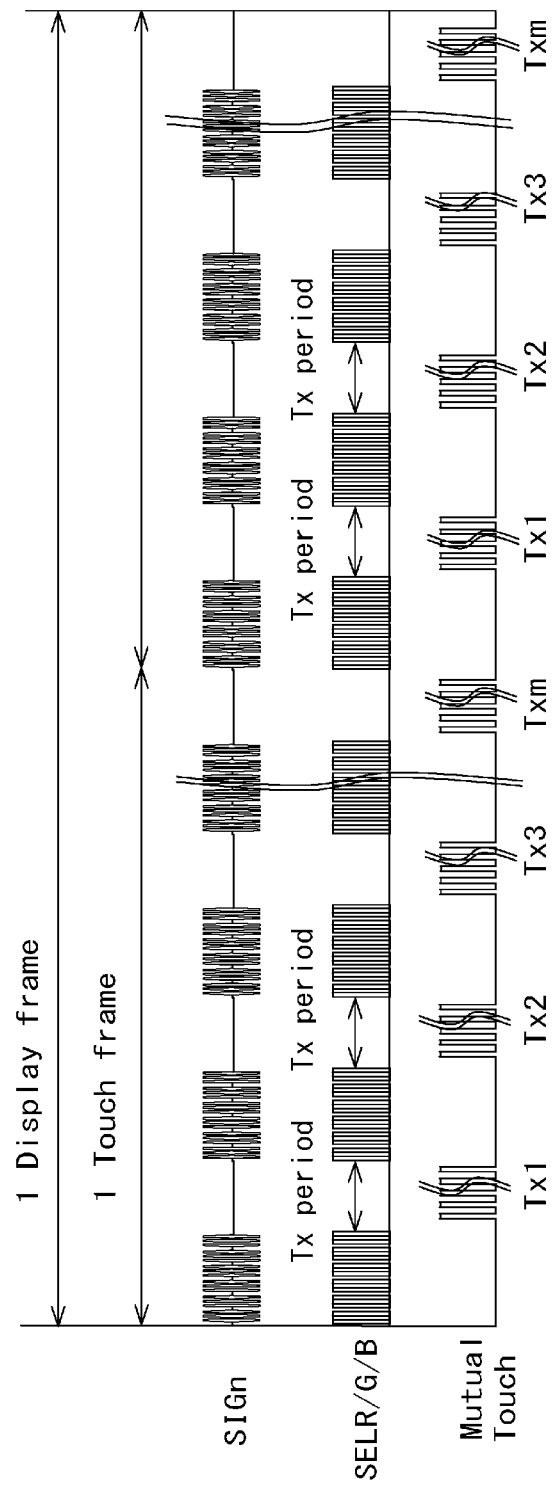

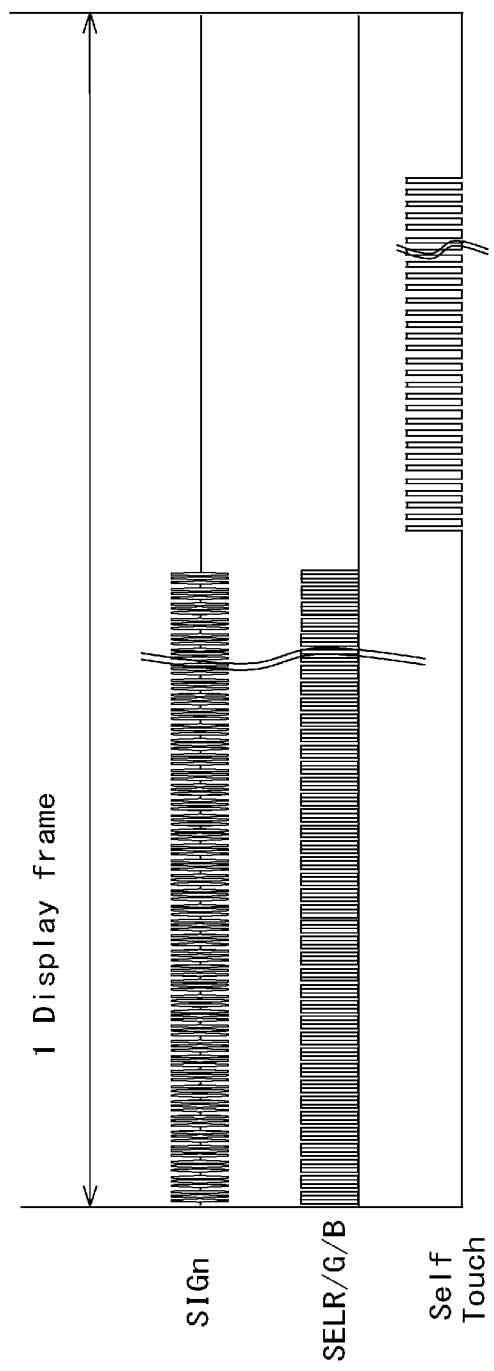

F I G . 7
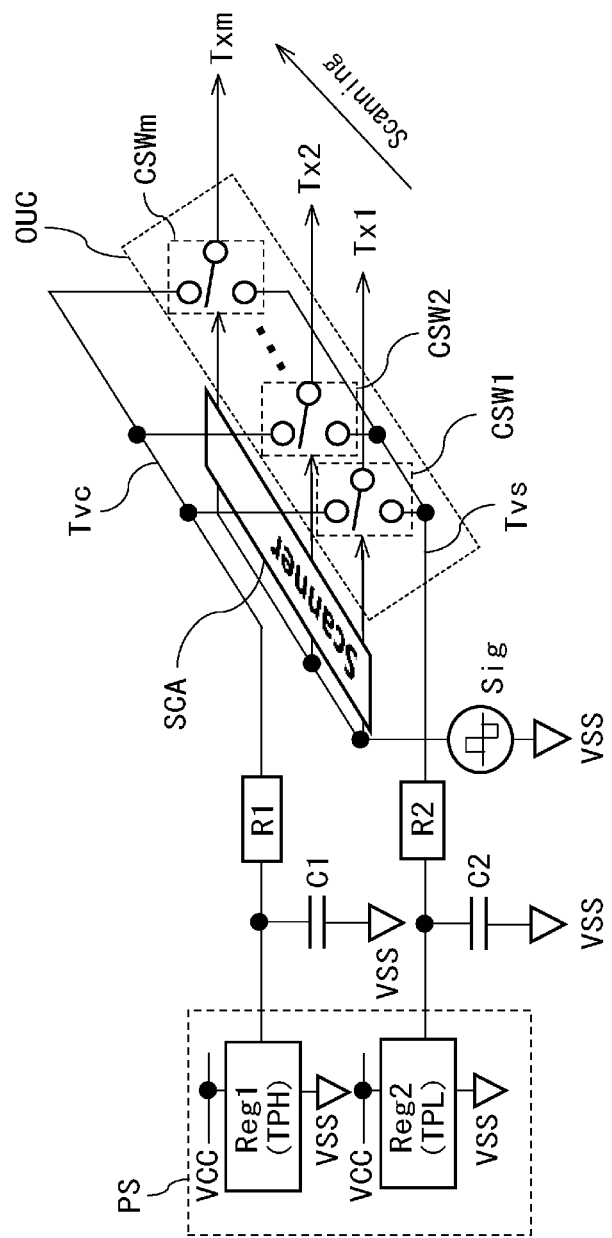

F I G . 1 9
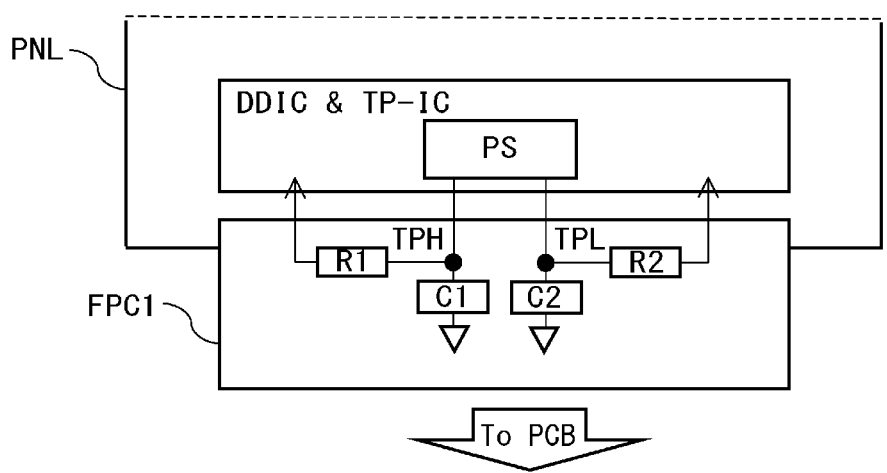

TOUCH PANEL DRIVING CIRCUIT

CROSS-REFERENCE TO RELATED APPLICATIONS

The present application is a continuation of U.S. patent application Ser. No. 16/157,774, filed on Oct. 11, 2018, which application claims priority from Japanese Patent Application JP 2017-201712 filed on Oct. 18, 2017, the content of which is hereby incorporated by reference into this application.

BACKGROUND OF THE INVENTION

The present invention relates to a display device that is specifically applicable to a display device equipped with a touch sensor.

In addition to a so-called on-cell type display device in which a touch panel is formed on the display surface of the display device, display devices below are proposed as display devices equipped with a touch sensor: a so-called in-cell type display device in which a display common electrode that is originally provided on the display device is shared as one (a drive electrode Tx) of paired touch sensor electrodes, the other electrode (a detection electrode Rx) is disposed crossing this common electrode, and the drive electrode Tx and the detection electrode Rx are integrated into the liquid crystal cell of the display device; a hybrid in-cell type display device in which a drive electrode Tx is disposed in the inside of the liquid crystal cell of the display device and a detection electrode Rx is disposed below the polarizer of the display device; and an in-cell type display device in which only a detection electrode Rx is disposed in the liquid crystal cell of the display device.

Japanese Unexamined Patent Application Publication No. 2011-221938 discloses a touch panel device. In the device, a transmission substrate 61 is provided with a capacitance-resistance (CR) circuit 12 as a CR time constant adjusting unit that adjusts the CR time constant of a transmission electrode 2. The CR circuit 12 includes a resistance component R and a capacitance component C. The CR circuit is set in such a manner that the CR time constant is greater as the wire length of a lead wire 71 connecting the transmission electrode 2 to the transmission substrate 61 is longer.

SUMMARY OF THE INVENTION

In order to reduce electromagnetic interference (EMI) due to the drive waveform on the transmission side in driving the electrostatic capacitance touch panel device, the inventors have investigated a technique for the purpose of mitigating the steepness of the drive waveform on the transmission side, the technique with which the harmonic component is reduced by inserting dumping resistance elements individually into a plurality of drive electrodes on the transmission side.

However, in this method, it is found that the size of the touch panel device is likely increased because the dumping resistance elements are individually inserted into the plurality of drive electrodes.

An object of the present invention is to provide a display device equipped with a touch sensor that can decrease the area of the mounting surface with electromagnetic interference reduced.

The other objects and novel features will be apparent from the description of the present specification and the accompanying drawings.

The following is the brief summary of representative aspects according to the present invention.

That is, a display device includes a plurality of drive electrodes, an output circuit connected to the plurality of drive electrodes, a power supply circuit, and a resistor element. A power of the output circuit is connected to the power supply circuit through the resistor element.

A touch panel device includes a plurality of drive electrodes, an output circuit connected to the plurality of drive electrodes, a power supply circuit, and a resistor element. A power of the output circuit is connected to the power supply circuit through the resistor element.

BRIEF DESCRIPTION OF THE DRAWINGS

FIG. 1 is a diagram of a schematic configuration of a display device equipped with a sensor according to an embodiment;

FIG. 4A is a diagram of a method for driving the display device equipped with a sensor according to the embodiment by mutual capacitance sensing;

FIG. 4B is a diagram of a method for driving the display device equipped with a sensor according to the embodiment by self capacitance sensing;

FIG. 7 is a circuit diagram of an exemplary configuration of the drive circuit of the drive electrodes in FIG. 5 according to an exemplary modification;

FIG. 19 is a diagram of the arrangement of a power supply circuit, resistor elements, and capacitive elements according to exemplary arrangement 3;

DETAILED DESCRIPTION OF THE PREFERRED EMBODIMENTS

Figure 2:
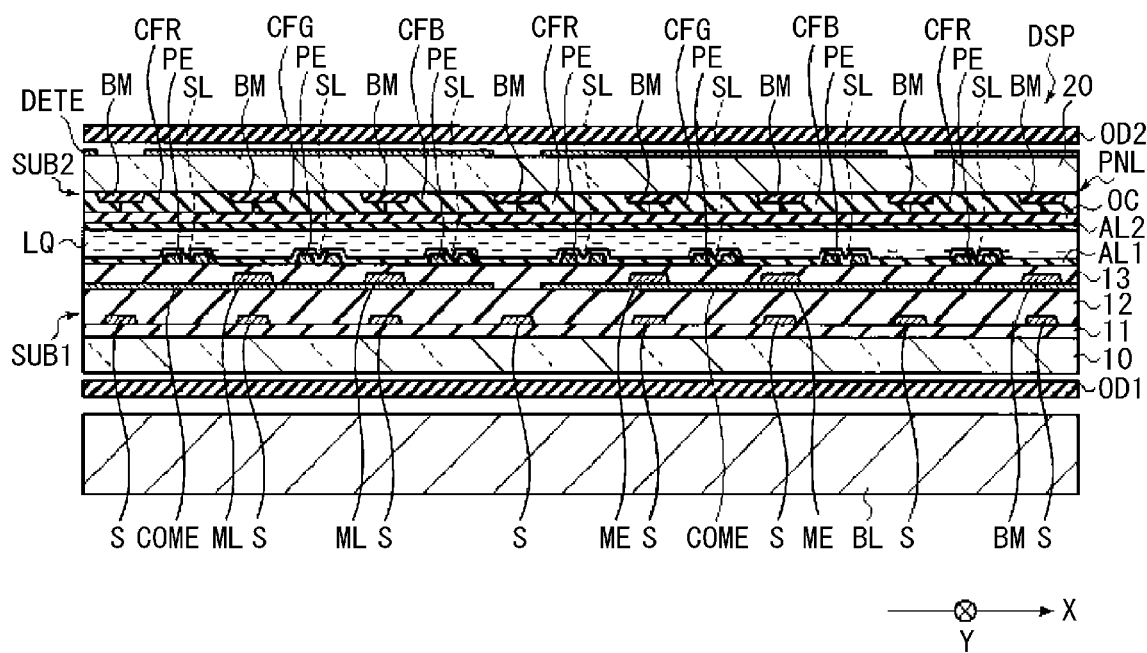
FIG. 2 is a cross sectional diagram of the structure of the display device equipped with a sensor according to the embodiment.

In the following, an embodiment of the present invention will be described with reference to the drawings.

Note that, the disclosure is merely an example. Appropriate modifications and alterations easily conceived by a person skilled in the art are of course included in the scope of the present invention. In order to provide more clear description, the width, thickness, shape, and any other parameters of components are sometimes schematically illustrated in the drawings, compared with the actual forms. However, these are mere examples, which will impose no limitations on the interpretation of the present invention. In the present specification and the drawings, components similar to the components in the drawings already described are designated the same reference signs, and the detailed description is sometimes appropriately omitted.

EMBODIMENT

FIG. 1 is a diagram of a schematic configuration of a display device DSP equipped with a sensor according to an embodiment. Note that, in the embodiment, the display device is a liquid crystal display device.

The display device DSP equipped with a sensor includes a display panel PNL and a backlight BLT that illuminates the display panel PNL from the back face side. The display panel PNL is provided with a display unit including display pixels PX disposed in a matrix configuration.

As shown in FIG. 1, the display unit includes gate lines G (G1, G2 . . . ) along which a plurality of display pixels PX are arrayed extending along the rows of the lines G, source lines S (S1, S2 . . . ) along which the display pixels PX is arrayed extending along the columns of the liens S, and pixel switches SW individually disposed near locations at which the gate line G, which is a scanning line, crosses the source line S, which is a signal line. The display pixels PX each have a pixel electrode PE, a common electrode COME, and a liquid crystal layer between the pixel electrode PE and the common electrode COME opposite to each other. The common electrodes COME extending in the row direction (X) are disposed in the lateral direction (Y). Note that, a configuration may be provided in which the common electrodes COME extending in the lateral direction (Y) are disposed in the row direction (X).

The pixel switch SW includes a thin film transistor (TFT). The gate electrode of the pixel switch SW is electrically connected to the corresponding gate line G. The source electrode of the pixel switch SW is electrically connected to the corresponding source line S. The drain electrode of the pixel switch SW is electrically connected to the corresponding pixel electrode PE.

As a drive unit that drives the display pixels PX, gate drivers GD (a left gate driver GD-L and a right gate driver GD-R), a source driver SD, and a common electrode drive circuit CD are provided. The gate lines G are electrically connected to the output parts of the gate drivers GD. The source lines S are electrically connected to the output parts of the source driver SD. The common electrodes COME are electrically connected to the output parts of the common electrode drive circuit CD. FIG. 1 illustrates the source driver SD and the common electrode drive circuit CD that are provided in the inside of the drive circuit.

The gate drivers GD, the source driver SD, and the common electrode drive circuit CD are disposed on the peripheral region (the picture frame region) of the display unit or a flexible substrate connected to the display panel PNL. In FIG. 1, the common electrode drive circuit CD is disposed on the control circuit CTR side of the display panel PNL. However, a configuration may be provided in which the common electrode drive circuit CD is disposed in parallel with the gate driver (GD) and the gate lines G are in turn driven. The gate drivers GD in turn apply an on-voltage to the gate lines G, and supply the on-voltage to the gate electrode of the pixel switch SW electrically connected to the selected gate line G. After the on-voltage is supplied to the gate electrode of the pixel switch SW, electricity is conducted between the source electrode and the drain electrode of the pixel switch SW. The source driver SD supplies an image voltage corresponding to the source lines S. The voltage supplied to the source line S is supplied to the corresponding pixel electrode PE through the pixel switch SW at which electricity is conducted between the source electrode and the drain electrode.

The operations of the gate drivers GD, the source driver SD, and the common electrode drive circuit CD are controlled by a control circuit CTR disposed on the outside or in the inside of the display panel PNL. The control circuit CTR controls the operation of the backlight BLT.

FIG. 2 is a cross sectional diagram of the structure of the display device DSP equipped with a sensor according to the embodiment.

The display device DSP equipped with a sensor has an in-cell type touch sensor, and includes the display panel PNL, the backlight BLT, a first optical device OD1, and a second optical device OD2. In the example shown in FIG. 2, the display panel PNL is a liquid crystal display panel. However, the display panel PNL may be other flat panels, such as an organic electroluminescent display panel. The display panel PNL shown in FIG. 2 has a configuration that enables horizontal electric field mode as a display mode. However, the display panel PNL may have a configuration that enables other display modes.

The display panel PNL includes a first substrate SUB1, a second substrate SUB2, and a liquid crystal layer LQ. The first and the second substrates SUB1 and SUB2 are bonded to each other with a predetermined cell gap formed. The liquid crystal layer LQ is held in the cell gap between the first and the second substrates SUB1 and SUB2.

The first substrate SUB1 is formed using a first insulating substrate 10 having optical transparency, such as a glass substrate and a resin substrate. On the first substrate SUB1, the source line S, the common electrode COME, the pixel electrode PE, a first insulating film 11, a second insulating film 12, a third insulating film 13, a first alignment film AL1, and any other components are provided on the first insulating substrate 10 opposite to the second substrate SUB2.

Here, the pixel electrode PE and the common electrode COME configure the display pixel together with the pixel region of the liquid crystal layer disposed between these electrodes. The display pixel is disposed on the display panel PNL in a matrix configuration.

The first insulating film 11 is disposed on the first insulating substrate 10. Note that, although not described in detail, the gate line G, the gate electrode and semiconductor layer of the switching device, and any other elements are disposed between the first insulating substrate 10 and the first insulating film 11. The source line S is formed on the first insulating film 11. The source electrode, the drain electrode, and any other elements of the switching device are also formed on the first insulating film 11. In the example shown in FIG. 2, the source line S extends in the second direction Y in parallel with the common electrode COME.

The second insulating film 12 is disposed on the source line S and the first insulating film 11. The common electrode COME is formed on the second insulating film 12. In the example shown in FIG. 2, the common electrode COME is configured of a plurality of segments. The segments of the common electrode COME extend in the second direction Y, and are arrayed in the first direction X with a gap. The common electrode COME is formed of a transparent conductive material, such as indium tin oxide (ITO) and indium zinc oxide (IZO). Note that, in the example shown in FIG. 2, on the common electrode COME, a metal layer ML is formed to decrease the resistance of the common electrode COME. However, the metal layer ML may be omitted.

The third insulating film 13 is disposed on the common electrode COME, the metal layer ML, and the second insulating film 12. The pixel electrode PE is formed on the third insulating film 13. The pixel electrodes PE are each located between the adjacent source lines S, and faced to the common electrode COME. The pixel electrodes PE each have a slit SL at the position opposite to the common electrode COME. The pixel electrode PE is formed of a transparent conductive material including ITO and IZO, for example. The first alignment film AL1 covers the pixel electrode PE and the third insulating film 13.

On the other hand, the second substrate SUB2 is formed using a second insulating substrate 20, such as a glass substrate and a resin substrate having optical transparency. On the second substrate SUB2, a black matrix BM, color filters CFR, CFG, and CFB, an overcoat layer OC, a second alignment film AL2, and any other elements are provided on the first substrate SUB1 opposite to the second insulating substrate 20.

The black matrix BM is formed on the inner face of the second insulating substrate 20, and defines the pixels. The color filters CFR, CFG, and CFB are formed on the inner face of the second insulating substrate 20, and partially overlapped with the black matrix BM. The color filter CFR is a red color filter, for example. The color filter CFG is a green color filter, for example. The color filter CFB is a blue color filter, for example. The overcoat layer OC covers the color filters CFR, CFG, and CFB. The overcoat layer OC is formed of a transparent resin material. The second alignment film AL2 covers the overcoat layer OC.

A detection electrode DETE is formed on the outer face of the second insulating substrate 20. The detection electrode DETE extends in the direction crossing the segments of the common electrode COME. In the example shown in FIG. 2, the detection electrode DETE extends in the first direction X. The detection electrode DETE is formed of a transparent conductive material including ITO and IZO, for example.

The backlight BLT is disposed on the back face side of the display panel PNL. Various forms are applicable to the backlight BLT. Any form is applicable to the backlight BLT, including one using a light emitting diode (LED) as a light source and one using a cold-cathode fluorescent lamp (CCFL).

The first optical device OD1 is disposed between the first insulating substrate 10 and the backlight BLT. The second optical device OD2 is disposed on the detection electrode DETE. The first and the second optical devices OD1 and OD2 include at least a polarizer, and may include a retardation plate, as necessary.

Next, a touch sensor for use in the display device DSP equipped with a sensor will be described. As described above, as a method for detecting an external approaching object, such as the finger of a user or a pen, in contact with the touch panel or in proximity to the touch panel, there are mutual capacitance sensing and self capacitance sensing.

Mutual Capacitance Sensing

Figure 3A:
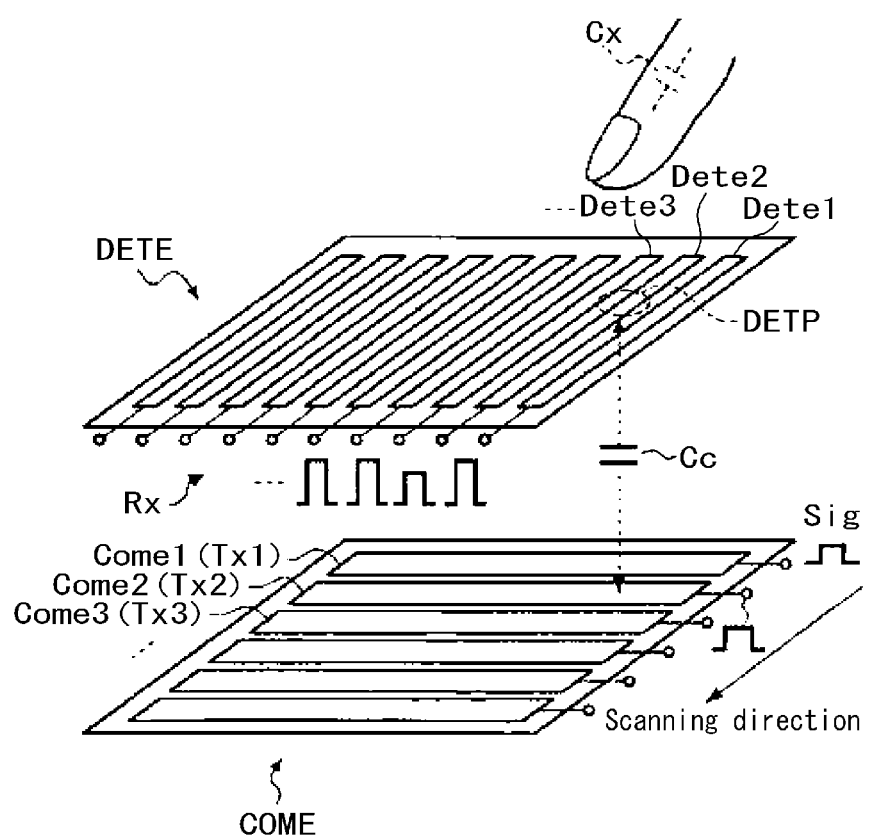
FIG. 3A is a diagram of a representative basic configuration of mutual capacitance sensing using the display device equipped with a sensor according to the embodiment.

FIG. 3A is a diagram of a representative basic configuration of mutual capacitance sensing for the display device DSP equipped with a sensor according to the embodiment. As the sensor, the common electrode COME (Tx) and the detection electrode DETE (Rx) are used.

The common electrode COME (Tx) includes a plurality of common electrodes Come1, Come2, Come3 .... The common electrodes Come1, Come2, Come3 ... are in stripes, for example. The common electrodes Come1, Come2, Come3 ... are arrayed in the scanning (drive) direction (the Y-direction or the X-direction).

On the other hand, the detection electrode DETE (Rx) includes a plurality of detection electrodes Dete1, Dete2, Dete3 ... (narrower than the common electrode). The detection electrodes Dete1, Dete2, Dete3 ... are in stripes, for example. The detection electrodes Dete1, Dete2, Dete3 ... are arrayed in the direction orthogonal to or crossing the common electrode (Tx) (the X-direction or the Y-direction).

The common electrode COME and the detection electrode DETE are disposed with a gap. Thus, between the common electrodes Come1, Come2, Come3 ... and the detection electrodes Dete1, Dete2, Dete3 ..., a capacitance Cc (baseline capacitance) as electrostatic capacitance is basically present.

A predetermined voltage is applied to each of the common electrodes (Come) in an image display period (a display period), and a pulse-like drive pulse is applied in a touch detection period (a detection period). Thus, in the detection period, the common electrode (Come) can also be referred to as the drive electrode (Tx).

The common electrodes Come1, Come2, Come3, ... i.e. the drive electrodes Tx in detection of a touch are scanned by the drive pulse (Sig) at predetermined cycles. Now, it is supposed that the finger of the user is present in proximity to the intersecting part of the detection electrode Dete2 with the drive electrode Tx2. At this time, after the drive pulse (Sig) is supplied to the drive electrode Tx2, a pulse-like waveform is obtained from the detection electrodes Rx (Dete1, Dete2, Dete3 ... ), and a pulse is obtained from the detection electrode Dete2. The pulse from the detection electrode Dete2 has the amplitude level lower than the amplitude level of the pulse obtained from the other detection electrodes. The detection electrodes Rx (Dete1, Dete2, Dete3 ... ) monitor fringing fields from the drive electrodes Tx (Come1, Come2, Come3 ... ). The detection electrodes Rx exert the effect that shields the fringing fields when a conductive object, such as a finger, is in proximity to the touch panel. Shielding the fringing fields decreases the detection potentials of the detection electrodes Rx.

In mutual capacitance sensing, the detection potential difference can be treated as the detection pulse at a position DETP. A capacitance Cx shown in FIG. 3A is different between the case in which the finger of the user is close to the detection electrode DETE and the case in which the finger is away from the detection electrode DETE. Because of the difference, the level of the detection pulse is also different between the case in which the finger of the user is close to the detection electrode DETE and the case in which the finger is away from the detection electrode DETE. Thus, the degree of proximity of the finger to the flat face of the touch panel can be determined by the amplitude level of the detection pulse. The two-dimensional position of the finger on the flat face of the touch panel can be detected using the drive timing of the drive electrodes Tx to which a drive pulse Sig is applied and the detection pulse at each drive timing.

Self Capacitance Sensing

Figure 3B:
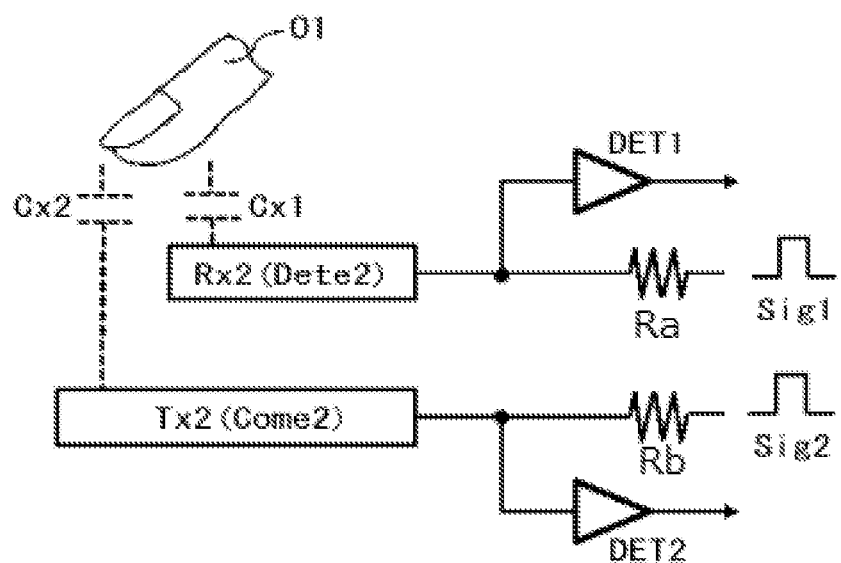
FIG. 3B is a diagram of a representative basic configuration of self capacitance sensing using the display device equipped with a sensor according to the embodiment.

FIG. 3B is a diagram of an exemplary configuration of self-capacitance sensing according to the embodiment. In self capacitance sensing, a pulse-like self capacitance sensing drive pulse is in turn supplied to the detection electrode DETE (Rx) and the common electrode COME (Tx) to detect the position and coordinates of the finger of the user that is an external approaching object. In this case, each of the detection electrode DETE (Rx) and the common electrode COME (Tx) is used for self-capacitance sensing. FIG. 3B illustrates the detection electrode Dete2 (Rx2) and the common electrode Come2 (Tx2) by example, showing the case in which a finger O1 of a user is in proximity to or in contact with the intersection point of the detection electrode Dete2 (Rx2) with the common electrode Come2 (Tx2). Because of the finger O1 of the user, the value of the electrostatic capacitance of the detection electrode Dete2 (Rx2) is increased to the value that is a sum of the self capacitance of the detection electrode Dete2 (Rx2) and a capacitance Cx1 due to the finger O1 of the user. Similarly, the value of the electrostatic capacitance of the common electrode Come2 (Tx2) is increased to the value that is a sum of the self capacitance of the common electrode Come2 (Tx2) and a capacitance Cx2 due to the finger O1 of the user. In this state, the detection electrode Dete2 (Rx2), for example, is first driven by a self capacitance sensing drive pulse Sig1 through a resistor Ra, and the increased electrostatic capacitance of the detection electrode Dete2 (Rx2) is charged by the self capacitance sensing drive pulse Sig1. A detection circuit DET1 detects the presence of the finger O1 of the user at the detection electrode Dete2 (Rx2) based on the value of the charging voltage increased by the capacitance Cx1. Subsequently, the common electrode Come2 (Tx2) is driven by a self capacitance sensing drive pulse Sig2 through a resistor Rb, and the increased electrostatic capacitance of the common electrode Come2 (Tx2) is charged by the self capacitance sensing drive pulse Sig2. The detection circuit DET2 detects the presence of the finger O1 of the user at the detection electrode Dete2 based on the value of the charging voltage increased by the capacitance Cx2. Thus, the presence of the finger O1 of the user at the intersection point of the detection electrode Dete2 (Rx2) with the common electrode Come2 (Tx2) is detected, and the position and coordinates of the finger O1 of the user on the flat face of the touch panel is detected.

Although not shown in FIG. 3B, similarly to FIG. 3A, the common electrode COME (Tx) and the detection electrode DETE (Rx) are sued as a sensor. Similarly to FIG. 3A, the common electrode COME whose elements are in turn driven (scanned) by the self capacitance sensing drive pulse Sig2 includes the common electrodes Come1 (Tx1), Come2 (TX2), Come3 (Tx3) . . . in stripes. The common electrodes Come1 (Tx1), Come2 (Tx2), Come3 (Tx3) . . . are arrayed in the Y-direction or the X-direction. Similarly, the detection electrode DETE whose elements are in turn driven (scanned) by the self capacitance sensing drive pulse Sig1 includes the detection electrodes Dete1 (Rx1), Dete2 (Rx2), Dete3 (Rx3) . . . in stripes (actually narrower than the common electrodes in stripes similarly to FIG. 3A). The detection electrodes Dete1 (Rx1), Dete2 (Rx2), Dete3 (Rx3) . . . are arrayed in the direction orthogonal to or crossing the common electrodes Come1 (Tx1), Come2 (Tx2), Come3 (Tx3) (the X-direction or the Y-direction). With the use of the configuration shown in FIG. 3B, both of the detection electrodes Dete1 (Rx1), Dete2 (Rx2), Dete3 (Rx3) . . . and the common electrodes Come1 (Tx1), Come2 (Tx2), Come3 (Tx3) . . . are in turn driven (scanned) by self capacitance sensing, and this enables the detection of the position of the external approaching object O1 at the intersection points of the detection electrodes Dete1 (Rx1), Dete2 (Rx2), Dete3 (Rx3) . . . with the common electrodes Come1 (Tx1), Come2 (Tx2), Come3 (Tx3) . . . . Note that, in the detection period in self capacitance sensing, the detection electrodes Dete1 (Rx1), Dete2 (Rx2), Dete3 (Rx3) . . . and the common electrodes Come1 (Tx1), Come2 (Tx2), Come3 (Tx3) . . . can be regarded as detection electrodes.

Such self capacitance sensing may be configured in which when the touch sensor is in low power consumption mode, only the detection electrodes Dete1 (Rx1), Dete2 (Rx2), Dete3 (Rx3) . . . are driven by the self capacitance sensing drive pulse Sig1 to detect only the presence or absence of an external approaching object, such as a finger, and then the operation is switched to mutual capacitance sensing to detect the coordinates of the external approaching object.

Note that, although not shown in FIGS. 3A and 3B, a configuration may be provided in which a switch, for example, is used to switch between mutual capacitance sensing and self capacitance sensing. The configuration of self capacitance sensing shown in FIG. 3B is merely an example, and it is not limited to it.

FIGS. 4A and 4B are diagrams illustrative of driving methods for the display device DSP equipped with a sensor according to the embodiment by mutual capacitance sensing and self capacitance sensing. As described above, the common electrode COME used for image display is shared as a touch position detection electrode. Thus, the image display operation and the touch position detection operation are driven by time sharing.

In mutual capacitance sensing shown in FIG. 4A, a period for which images are displayed and a period for which a touch position is detected are split. The split image display periods and the split touch position detection periods are alternately repeated to configure one display frame period. That is, the operation of outputting image signals (SIGn) for three colors in response to signals (SELR/G/B) that select red, green, and blue is executed on the split display rows, and then the operation of mutual capacitance sensing is executed in which the drive pulse Sig is inputted to the split drive electrodes Tx. This operation is executed in turn repeatedly on the split display columns and the split drive electrodes Tx. In this example, two frames of touch detection are performed in one display frame period. In one frame of the touch detection period, the drive electrodes Tx1, Tx2, Tx3 . . . are in turn scanned by the drive pulse Sig to detect the touch position.

In self capacitance sensing shown in FIG. 4B, after one frame image is displayed, the self capacitance sensing drive pulse (Sig1) is inputted to the entire detection electrode DETE to execute the operation of self capacitance sensing.

That is, after the operation of outputting image signals (SIGn) for three colors in response to signals (SELR/G/B) that select red, green, and blue is executed on all the display columns, the self capacitance sensing drive pulse (Sig1) is inputted to the entire detection electrode DETE to execute the operation of self capacitance sensing. Note that, a configuration may be provided in which the entire detection electrode DETE (Rx) is scanned by the self capacitance sensing drive pulse (Sig1), and then the entire common electrode COME (Tx) is scanned by the self capacitance sensing drive pulse (Sig2) to execute the operation of self capacitance sensing. The reason why the sensing operation is collectively performed by self capacitance sensing without splitting is that sensing data is collectively acquired to improve the sensitivity of sensing. Note that, self capacitance sensing is a method that can perform sensing at sensitivity higher than mutual capacitance sensing. Self capacitance sensing may be performed in the detection period shown in FIG. 4A (splitting method), not limited to the method in FIG. 4B.

Exemplary Configuration of the Drive Circuit of the Drive Electrode Tx

Figure 5:
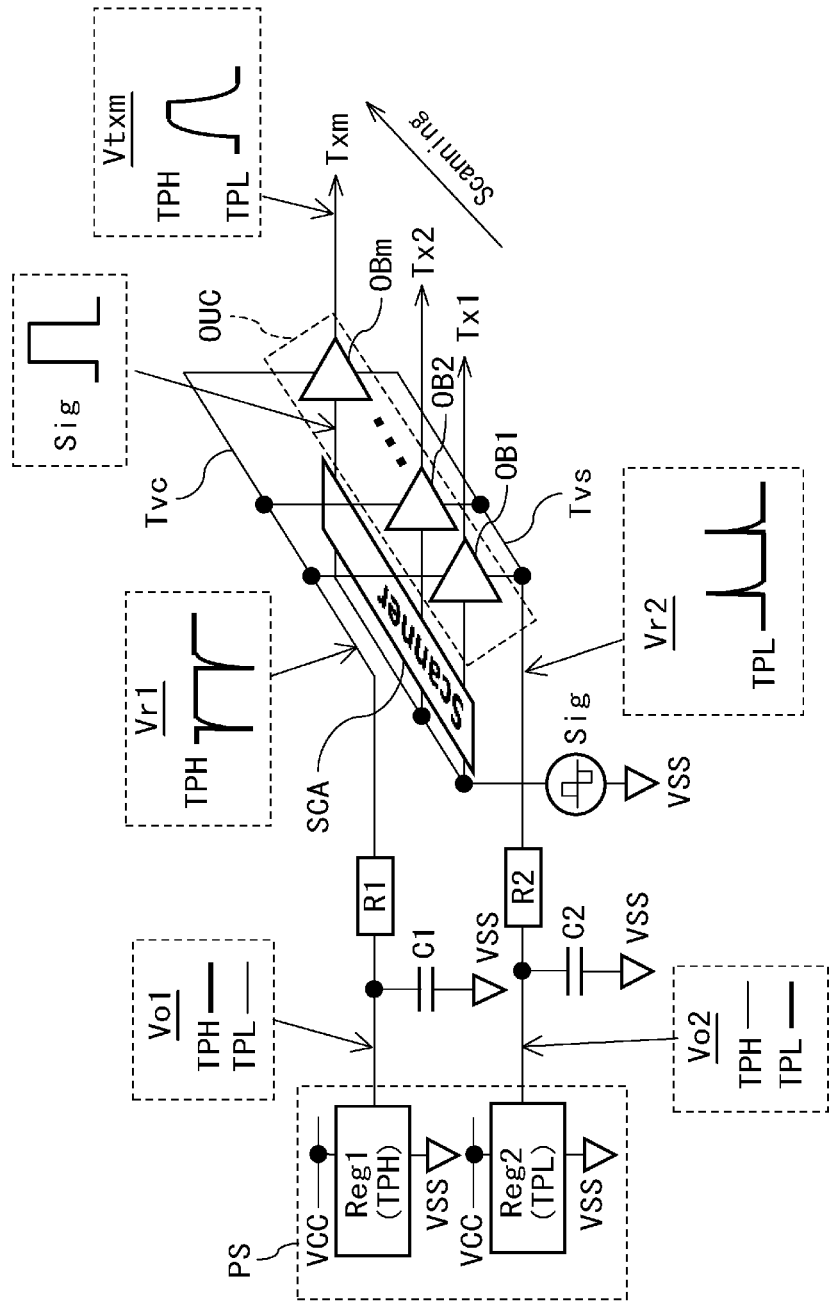
FIG. 5 is a circuit diagram of an exemplary configuration of the drive circuit of drive electrodes according to the embodiment.
Figure 6:
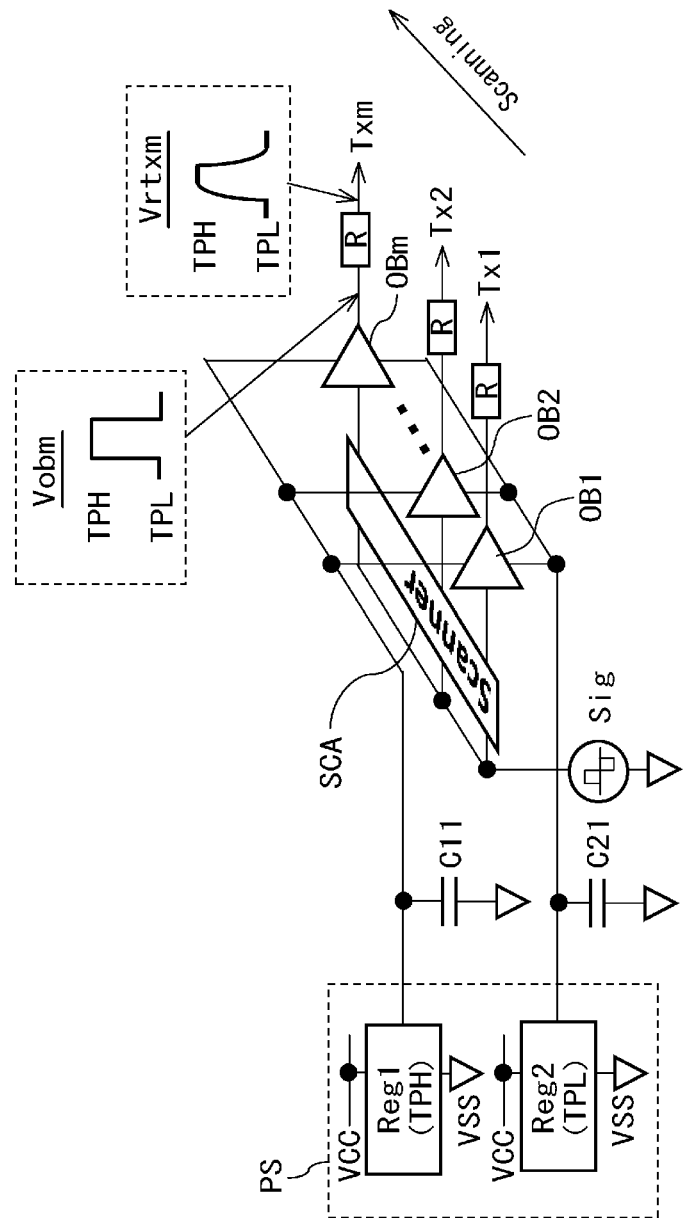
FIG. 6 is a circuit diagram of an exemplary configuration of the drive circuit of drive electrodes according to a comparative example.

FIG. 5 is a circuit diagram of an exemplary configuration of the drive circuit of the drive electrode Tx according to the embodiment. FIG. 6 is a circuit diagram of an exemplary configuration of the drive circuit of a drive electrode Tx according to a comparative example. FIG. 7 is a circuit diagram of an exemplary configuration of the drive circuit of the drive electrode Tx in FIG. 5 that is an exemplary modification.

As shown in FIG. 5, a power supply circuit PS includes a first power supply circuit Reg1 and a second power supply circuit Reg2. The first power supply circuit Reg1 is connected between a first reference potential VCC and a second reference potential VSS lower than the first reference potential VCC, and generates a first power supply potential TPH on the high potential side (see Vo1). On the other hand, the second power supply circuit Reg2 is connected between the first reference potential VCC and the second reference potential VSS lower than the first reference potential VCC, and generates a second power supply potential TPL on the low potential side lower than the first power supply potential TPH (see Vo2).

The output of the first power supply circuit Reg1 is connected to a first power supply terminal Tvc of an output circuit OUC through a first resistor element R1. Between the output of the first power supply circuit Reg1 and the second reference potential VSS, a first capacitive element C1 configured as a smoothing capacitance is connected.

The output of the second power supply circuit Reg2 is connected to a second power supply terminal Tvs of the output circuit OUC through a second resistor element R2. Between the output of the second power supply circuit Reg2 and the second reference potential VSS, a second capacitive element C2 configured as a smoothing capacitance is connected.

The output circuit OUC includes a plurality of output buffer circuits OB1, OB2 . . . OBm. The first power supply terminals of the output buffer circuits OB1, OB2 . . . OBm are connected to the output of the first power supply circuit Reg1 through the first resistor element R1. The second power supply terminals of the output buffer circuits OB1, OB2 . . . OBm are connected to the output of the second power supply circuit Reg2 through the second resistor element R2.

In the configuration, the outputs of the output buffer circuits OB1, OB2 . . . OBm are connected to the drive electrodes Tx1, Tx2 . . . Txm, and the inputs of the output buffer circuits OB1, OB2 . . . OBm selectively receive the rectangular pulse-like drive pulse Sig through a scanning circuit (scanner) SCA.

The scanning circuit (scanner) SCA in turn selects one drive electrode from the drive electrodes Tx1, Tx2 . . . Txm along the scanning direction (scanning) of the drive electrodes Tx1, Tx2 . . . Txm, and supplies the drive pulse Sig to the selected drive electrode. Thus, the drive electrodes Tx1, Tx2 . . . Txm are scanned along the scanning direction (scanning).

Referring to FIG. 5, the potentials in the case in which the output circuit OBm is selected will be described by example. After an input of the output circuit OBm receives the rectangular pulse-like drive pulse Sig, the output of the drive electrode Txm is transitioned from a low level (THL) to a high level (TPH) in response to the transition of the rectangular pulse-like drive pulse Sig from the low level to the high level. An electric current is carried from the first power supply terminal Tvc to the output of the drive electrode Txm corresponding to the load connected to the output of the drive electrode Txm. That is, the potential of the first power supply terminal of the output circuit OBm (see Vr1) is temporarily transitioned from the high level (TPH) to the low level side because the electric current is carried through the first resistor element R1, and then the potential is gradually returned to the high level (TPH). Thus, a potential Vtxm of the output of the output circuit OBm is gradually transitioned from the second power supply potential TPL to the first power supply potential TPH.

After that, in response to the transition of the rectangular pulse-like drive pulse Sig from the high level to the low level, the output of the drive electrode Txm of the output circuit OBm is transitioned from the high level (TPH) to the low level (TPL), and the electric current is carried from the output of the drive electrode Txm to the second power supply terminal Tvs corresponding to the load connected to the output of the drive electrode Txm. That is, the potential of the second power supply terminal of the output circuit OBm (see Vr2) is temporarily transitioned from the low level (TPL) to the high level side because the electric current is carried through the second resistor element R2, and then the potential is gradually returned to the low level (TPL). Thus, the potential Vtxm of the output of the output circuit OBm is gradually transitioned from the first power supply potential TPH to the second power supply potential TPL.

The first and the second resistor elements R1 and R2 mitigate the steepness of the drive waveform of the potential Vtxm of the output of the output circuit OBm. Thus, a reduction in electromagnetic interference is enabled. The number of resistor elements that are provided for a reduction in electromagnetic interference is two, the first and the second resistor elements R1 and R2, and this enables a decrease in the area of the mounting surface of the display device equipped with a touch sensor.

FIG. 6 is a circuit diagram of an exemplary configuration of the drive circuit of the drive electrode Tx according to the comparative example. In the comparative example, the first and the second resistor elements R1 and R2 in FIG. 5 are not provided, and one resistor element R is connected to each of the outputs of output buffer circuits OB1, OB2 . . . OBm. The other configurations are the same as FIG. 5, and the detailed description is omitted.

As shown in FIG. 6, the output potential (Vobm) of the output of the output buffer circuit OBm has a rectangular pulse. The resistor element R mitigates the steepness of the drive waveform of the potential Vtxm similarly to the potential Vtxm in FIG. 5.

As understood from the comparison of FIG. 5 with FIG. 6, in the exemplary modification of FIG. 6, the resistor elements R are required to have the same number as the number of the output buffer circuits OB1, OB2 ... OBm or the number of the drive electrodes Tx1, Tx2 ... Txm. This is one of the factors that hampers a decrease in the area of the mounting surface of the display device equipped with a touch sensor or a reduction in the number of parts. In FIG. 5, the first resistor element R1 connected to the output of the first power supply circuit Reg1 and the second resistor element R2 connected to the output of the second power supply circuit Reg2 only have to be provided. This enables a decrease in the area of the mounting surface of the display device equipped with a touch sensor or a reduction in the number of parts.

FIG. 7 is an exemplary modification of FIG. 5. The output buffer circuits OB1, OB2 ... OBm in the output circuit OUC in FIG. 5 are changed to analog switch circuits. The other configurations are the same as FIG. 5, and the detailed description is omitted.

In FIG. 7, examples of output circuits (analog switch circuits) in the output circuit OUC that are adoptable are CMOS analog switch circuits CSW1, CSW2 ... CSWm. This configuration also can exert the effect similar to the effect in FIG. 5.

Figure 8:
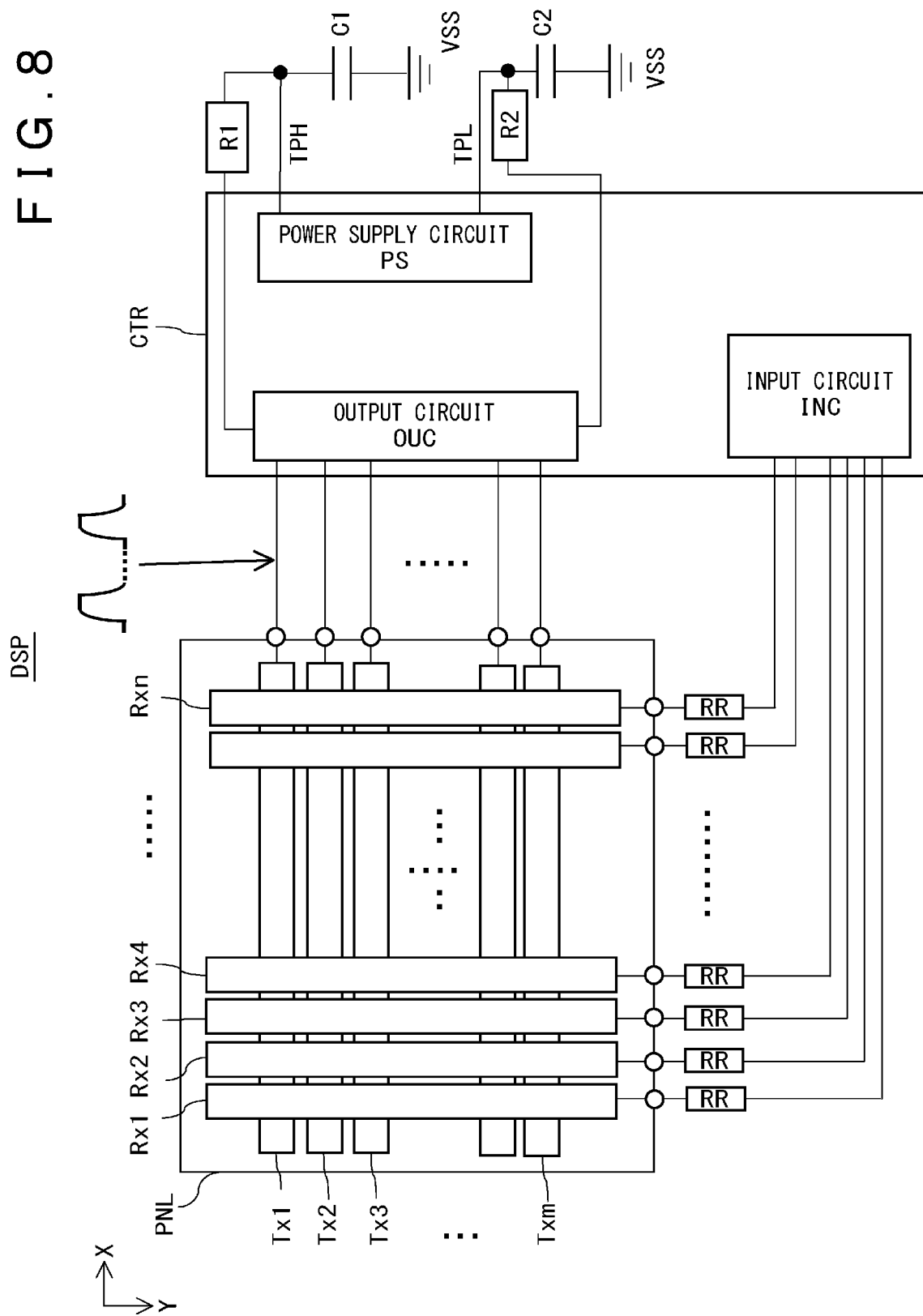
FIG. 8 is a block diagram of the schematic configuration of a display device equipped with a sensor according to the embodiment.
Figure 9:
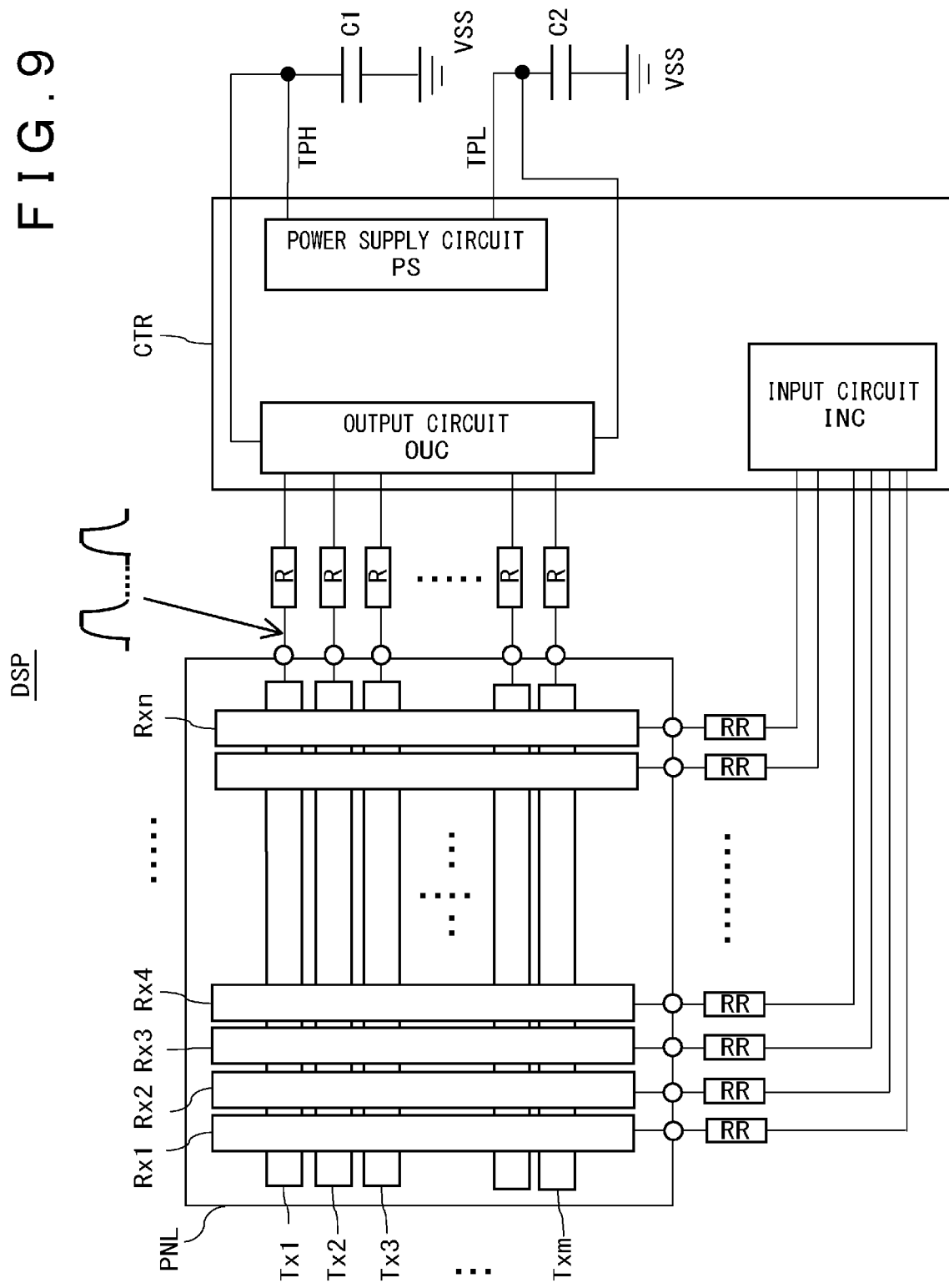
FIG. 9 is a block diagram of the schematic configuration of a display device equipped with a sensor according to a comparative example.
Figure 10:
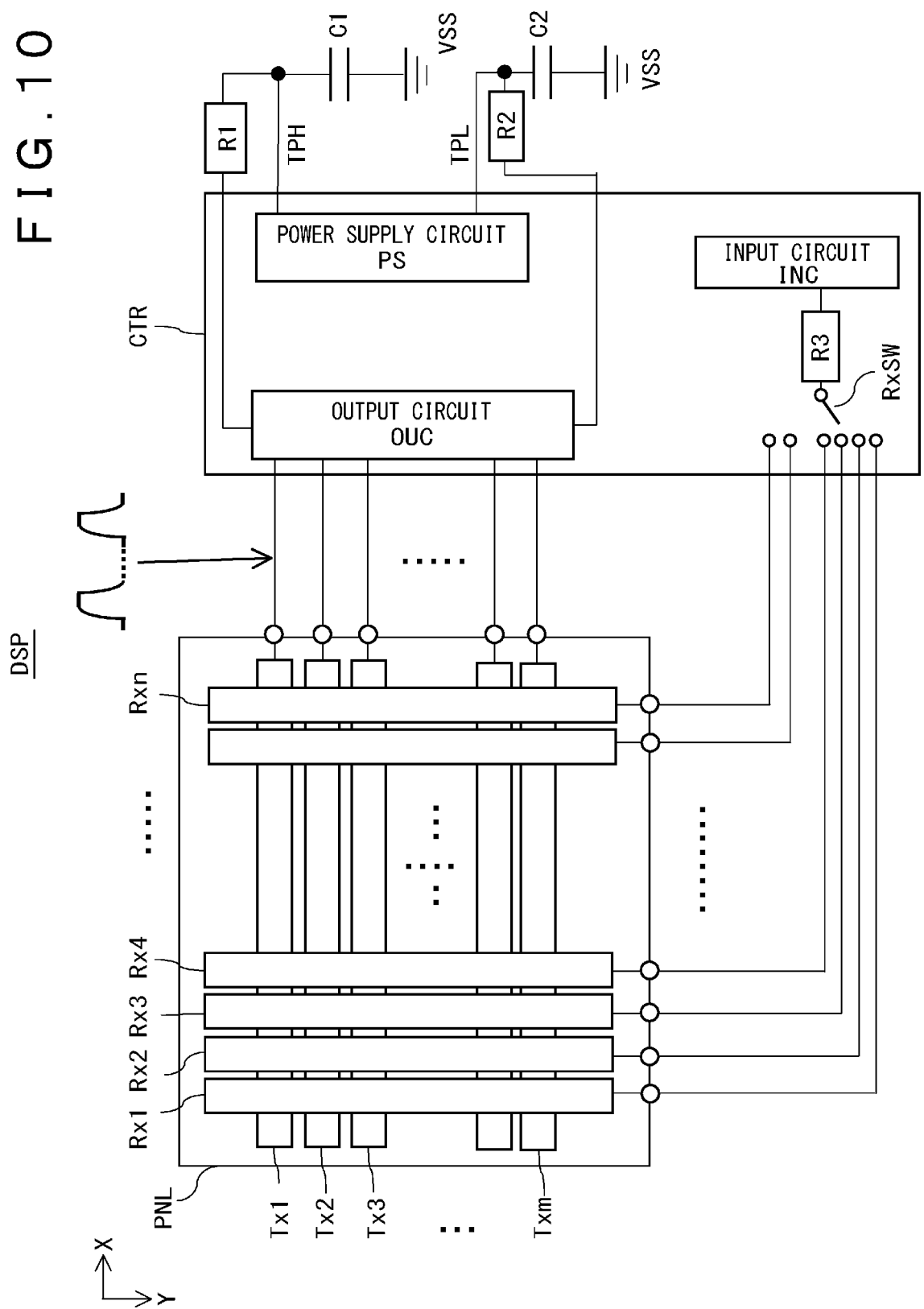
FIG. 10 is a block diagram of the schematic configuration of a display device equipped with a sensor according to an exemplary modification.

FIG. 8 is a block diagram of a schematic exemplary configuration of a display device DSP equipped with a sensor according to the embodiment. FIG. 9 is a block diagram of a schematic exemplary configuration of a display device DSP equipped with a sensor according to a comparative example. FIG. 10 is a block diagram of a schematic exemplary configuration of a display device DSP equipped with a sensor according to an exemplary modification of FIG. 8.

As shown in FIG. 8, the display device DSP equipped with a touch sensor includes a display panel PNL and a control circuit CTR. The configuration of the touch sensor unit of the display panel PNL in FIG. 1 is mainly illustrated in the display panel PNL in FIG. 8. The display panel PNL has drive electrodes Tx1, TX2 ... Txm provided in parallel with each other along the X-direction (or the Y-direction) and detection electrodes Rx1, Rx2 ... Rxn provided in parallel with each other along the Y-direction (or the X-direction) crossing the X-direction (or the Y-direction).

The drive electrodes Tx1, TX2 ... Txm are connected to an output circuit OUC provided in the control circuit CTR. The detection electrodes Rx1, Rx2 ... Rxn are connected to an input circuit INC provided in the control circuit CTR through resistor elements RR. The input circuit INC can also be regarded as a detection circuit that receives detection signals from the detection electrodes Rx1, Rx2 ... Rxn. The resistor elements RR are provided to secure electromagnetic susceptibility (EMS) or immunity.

The control circuit CTR includes the power supply circuit PS described in FIG. 5 in addition to the output circuit OUC and the input circuit INC. The power supply circuit PS generates the first power supply potential TPH on the high potential side and the second power supply potential TPL on the low potential side. The first and the second power supply potentials TPH and TPL generated at the power supply circuit PS are supplied to the output circuit OUC through a first resistor element R1 and a resistor element second R2. A capacitive element C1 is provided between the first power supply potential TPH and the second reference potential VSS. A capacitive element C2 is provided between the second power supply potential TPL and the second reference potential VSS. The first and the second resistor elements R1 and R2 are provided to reduce electromagnetic interference.

The input circuit INC in the control circuit CTR is the detection circuit that detects the presence or absence of an object, such as a finger and a pen, on the touch panel, and the coordinates and position of the object from the potentials of the detection electrodes Rx1, Rx2 ... Rxn when the drive electrodes Tx1, TX2 ... Txm are scanned by the drive pulse Sig. Note that, the control circuit CTR can be configured of a display controller (a display control unit) DDIC or a touch sensor controller (a touch control unit or a touch controller) TP-IC.

With the configuration above, the display device DSP equipped with a touch sensor having a decreased area of the mounting surface can be provided taking into account of electromagnetic interference and electromagnetic susceptibility.

FIG. 9 is the display device DSP equipped with a sensor according to the comparative example. This is the configuration that the configuration of the drive circuit of the drive electrode Tx according to the comparative example shown in FIG. 6 is adapted to the display device DSP equipped with a sensor. The difference from the configuration in FIG. 8 is that the first and the second resistor elements R1 and R2 are removed and the resistor elements R are provided individually between the output circuit OUC and the drive electrodes Tx1, TX2 ... Txm. The other configurations are the same as FIG. 8, and the detailed description is omitted.

In this comparative example, the number of the resistor elements R corresponds to the number of the drive electrodes Tx1, TX2 ... Txm. Consequently, the area of the mounting surface of the display device DSP equipped with a sensor might be increased corresponding to the number of the drive electrodes Tx1, TX2 ... Txm.

FIG. 10 is the exemplary modification of the display device DSP equipped with a sensor in FIG. 8. The difference between FIG. 10 and FIG. 8 is that each of the resistor elements RR provided between the detection electrodes Rx1, Rx2 ... Rxn and the input circuit INC in FIG. 8 are removed and a switching device RxSW and a third resistor element R3 are provided between the switching device RxSW and the input circuit INC in the control circuit CTR. The third resistor element R3 is provided to secure electromagnetic susceptibility or immunity.

The switching device RxSW in turn selects one detection electrode from the detection electrodes Rx1, Rx2 ... Rxn along the scanning direction in the touch detection period. The selected detection electrode is connected to the input circuit INC through the third resistor element R3. Thus, the input circuit INC detects the presence or absence of an object, such as a finger and a pen, on the touch panel, and the coordinates and position of the object from the potentials of the detection electrodes Rx1, Rx2 ... Rxn when the drive electrodes Tx1, TX2 ... Txm are scanned by the drive pulse Sig. The other configurations are the same as FIG. 8, and the detailed description is omitted.

With the configuration above, the resistor elements RR provided in FIG. 8 are replaced by one third resistor element R3. Thus, the display device DSP equipped with a touch sensor with the area of the mounting surface further decreased can be provided, while taking into account of electromagnetic interference and electromagnetic susceptibility.

Exemplary Configurations of Display Devices DSP Equipped with a Sensor

In the following, exemplary configurations of display devices DSP equipped with a sensor will be described with reference to FIGS. 11 to 16. Note that, exemplary configuration 1 to exemplary configuration 3 in FIGS. 11 to 13 can use both of mutual capacitance sensing and self capacitance sensing described in FIGS. 3A and 3B. In the following description, the case of using mutual capacitance sensing is mainly described. Exemplary configuration 4 to exemplary configuration 6 in FIGS. 14 and 16 can use self capacitance sensing described in FIG. 3B.

Exemplary Configuration 1

Figure 11:
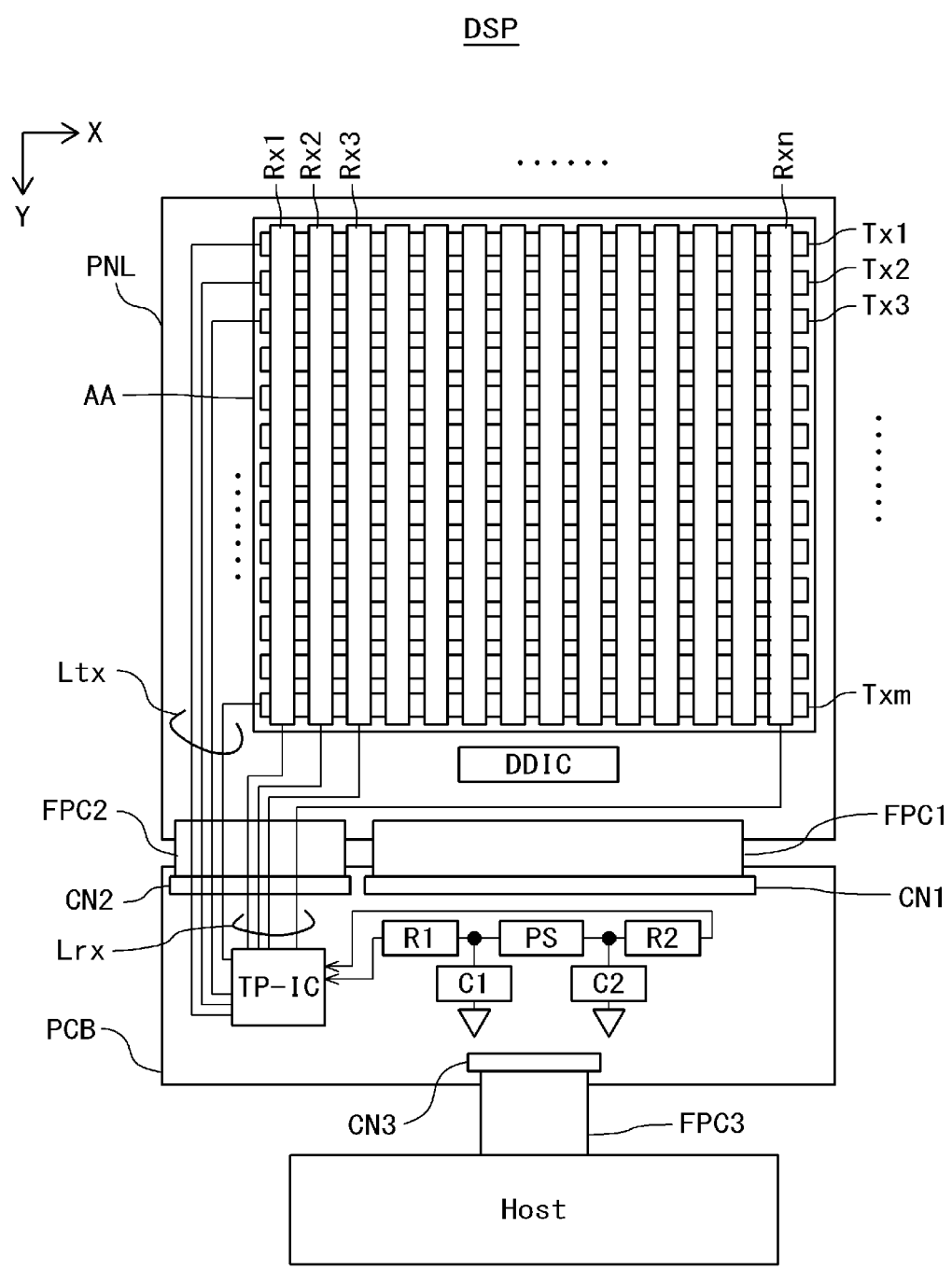
FIG. 11 is a diagram of a display device equipped with a sensor according to exemplary configuration 1.

FIG. 11 is a diagram of exemplary configuration 1 of the display device DSP equipped with a sensor according to the embodiment. Exemplary configuration 1 shows an in-cell type display device DSP equipped with a touch sensor. In the configuration of the in-cell type display device DSP equipped with a touch sensor, a display common electrode (common electrodes Come1, Come2 . . . ) that is originally provided on the display device DSP is shared as one electrode (drive electrodes Tx1, Tx2 . . . Txm) of the paired touch sensor electrodes and the other electrode (detection electrodes Rx1, Rx2 . . . Rxn) is disposed crossing the common electrode (Come1, Come2 . . . ). A voltage corresponding to display drive is supplied to the common electrode as the common electrode (Come1, Come2, Come3 . . . ) in display operation. The drive pulse Sig for touch detection is applied to the common electrode as the drive electrode (Tx1, Tx2 . . . Txm) for touch drive in the touch detection period.

In FIG. 11, the display device DSP equipped with a sensor has a display panel PNL, a display controller DDIC disposed on the display panel PNL, a touch controller TP-IC, and a host processor HOST.

The display panel PNL has an array substrate AR (SUB1) and a counter substrate CT (SUB2) (see FIG. 2). The display panel PNL has an active region AA formed of a display region DAA and a touch detection region TAA. In the active region AA, the array substrate AR has a plurality of display pixels PX disposed in a matrix configuration and the drive electrodes Tx1, TX2 . . . Txm disposed in parallel with each other in the Y-direction, extending in the X-direction. In the active region AA, the counter substrate CT (SUB2) has the detection electrodes Rx1, Rx2 . . . Rxn disposed in parallel with each other in the X-direction, extending in the Y-direction.

The display controller DDIC is disposed on the display panel PNL, and controls the display operation of the display pixels PX in accordance with display data and the instruction from the host processor HOST.

The display panel PNL is connected to a connector CN1 provided on a control substrate PCB through a flexible printed board (Flexible Print Circuit board) FPC1. The display panel PNL is connected to a connector CN2 provided on the control substrate PCB through a flexible printed board FPC2.

The control substrate PCB is provided with the touch controller TP-IC and with a power supply circuit PS, a first resistor element R1, a second resistor element R2, a first capacitive element C1, and a second capacitive element C2, which are described in FIG. 5 or FIG. 7.

To the touch controller TP-IC, the first and the second power supply potentials TPH and TPL generated at the power supply circuit PS are supplied through the first and the second resistor elements R1 and R2. In this example, the touch controller TP-IC includes a scanning circuit SCA and an output circuit OUC. The output circuit OUC is configured of output buffer circuits OB1 to OBm or CMOS analog switch circuits CSW1 to CSWm.

The outputs of the output circuit OUC in the touch controller TP-IC are connected to the drive electrodes Tx1, Tx2 . . . Txm using a plurality of connection wires Ltx through the flexible printed board FPC2. The detection electrodes Rx1 to Rxn are connected to an input circuit INC provided in the touch controller TP-IC using a plurality of connection wires Lrx through the flexible printed board FPC2 (see FIG. 8 or FIG. 10).

Note that, FIG. 11 omits the resistor elements RR described in FIG. 8 for simplifying the drawing. The resistor elements RR in FIG. 8 are provided on the connection wires Lrx between the detection electrodes Rx1 to Rxn and the input circuit INC. In the case of adopting the configuration in FIG. 10, the switching device RxSW and the third resistor element R3 in FIG. 10 are provided in the touch controller TP-IC.

The control substrate PCB is provided with a connector CN3 and a flexible printed board FPC3 connected to the connector CN3. The host processor HOST is connected to the flexible printed board FPC3. The host processor HOST is connected to the touch controller TP-IC. In the touch detection period, the host processor HOST is supplied with a touch ID detected at the touch controller TP-IC and the coordinates of the touch ID, and executes a desired process based on the touch ID and the coordinates. The host processor HOST is connected to the display controller DDIC through the control substrate PCB, the connector CN1, and the flexible printed board FPC1. In the display period, for example, the host processor HOST supplies display data to the display controller DDIC.

Note that, in the configuration, the power supply circuit PS is provided on the control substrate PCB, and it is not limited to it. The power supply circuit PS may be integrated into the touch controller TP-IC, or may be integrated into the display controller DDIC.

The touch controller TP-IC may be provided on the flexible printed board FPC2.

Exemplary Configuration 2

Figure 12:
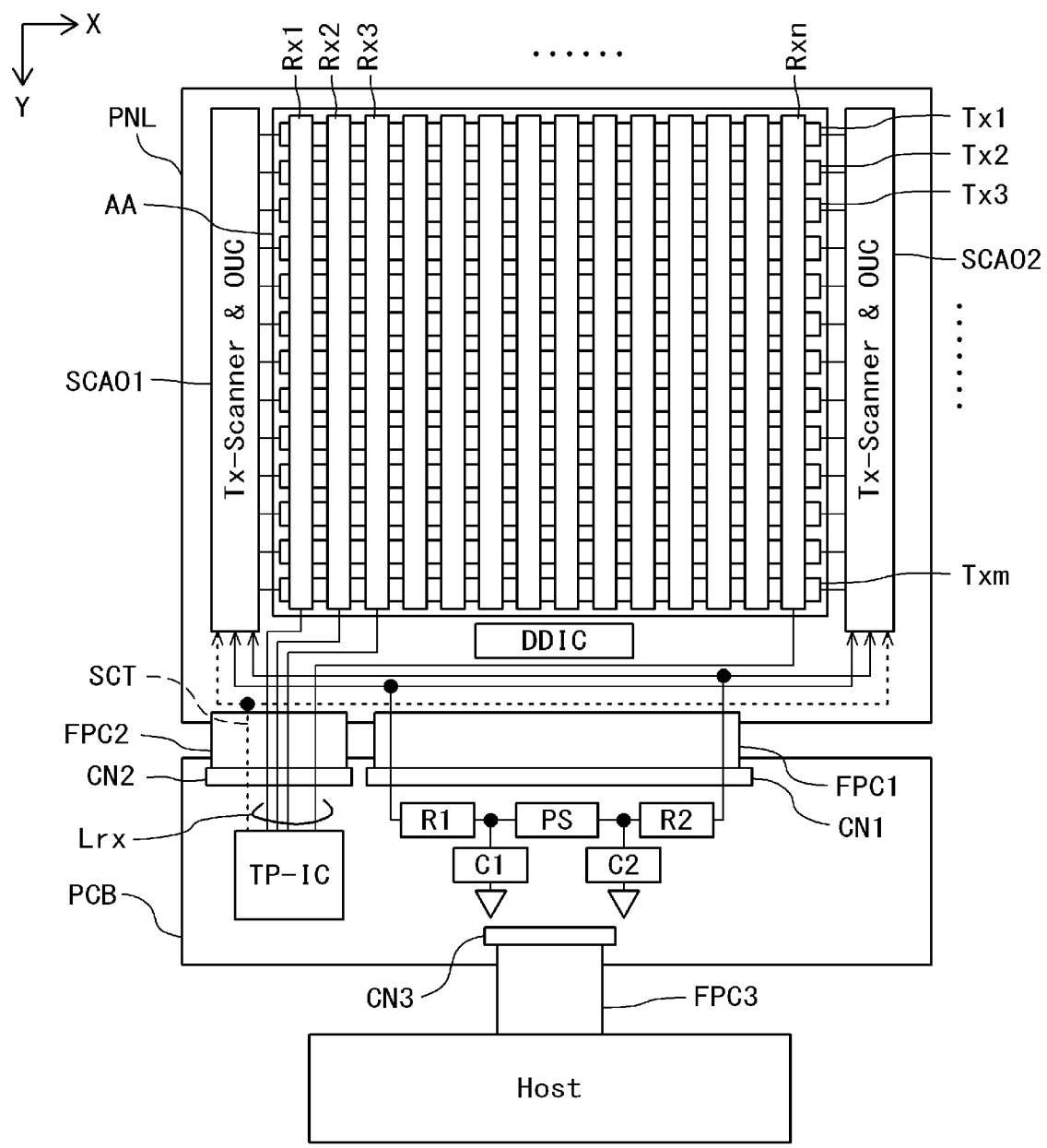
FIG. 12 is a diagram of a display device equipped with a sensor according to exemplary configuration 2.

FIG. 12 is a diagram of exemplary configuration 2 of the display device DSP equipped with a sensor according to the embodiment. Similarly to FIG. 11, exemplary configuration 2 shows an in-cell type display device DSP equipped with a touch sensor. Exemplary configuration 1 in FIG. 11 has the configuration in which the scanning circuit (scanner) SCA in FIG. 5 is integrated into the touch controller TP-IC. In exemplary configuration 2 in FIG. 12, the scanning circuit (scanner) SCA and the output circuit OUC are a first scanning circuit (Tx-Scanner and OUC) SCAO1 and a second scanning circuit (Tx-Scanner and OUC) SCAO2. The first and the second scanning circuits SCAO1 and SCAO2 are provided on the left side and the right side of the active region AA of a display panel PNL in the drawing. The outputs of the output circuit OUC in the first scanning circuit SCAO1 are connected to drive electrodes Tx1 to Txm. The outputs of the output circuit OUC in the second scanning circuit SCAO2 are connected to the drive electrodes Tx1 to Txm. The output circuits OUC of the first and the second scanning circuits SCAO1 and SCAO2 can be output buffer circuits OB1 to OBm or CMOS analog switch circuits CSW1 to CSWm as described in FIGS. 5 and 7.

A control substrate PCB is provided with a touch controller TP-IC and with a power supply circuit PS, a first resistor element R1, a second resistor element R2, a first capacitive element C1, and a second capacitive element C2, which are described in FIG. 5 or FIG. 7. The first and the second power supply potentials TPH and TPL generated at the power supply circuit PS are supplied to the first and the second scanning circuits SCAO1 and SCAO2 through the first and the second resistor elements R1 and R2 via a flexible printed board FPC1. The touch controller TP-IC supplies a scan timing signal SCT to the first and the second scanning circuits SCAO1 and SCAO2 via a flexible printed board FPC2. Thus, the scan timings of the first and the second scanning circuits SCAO1 and SCAO2 are synchronized.

The detection electrodes Rx1 to Rxn are connected to an input circuit INC provided in the touch controller TP-IC using connection wires Lrx through the flexible printed board FPC2 (see FIG. 8 or FIG. 10). Note that, FIG. 12 omits the resistor elements RR described in FIG. 8 for simplifying the drawing. The resistor elements RR in FIG. 8 are provided on the connection wires Lrx between the detection electrodes Rx1 to Rxn and the input circuit INC. In the case of adopting the configuration in FIG. 10, the switching device RxSW and the third resistor element R3 in FIG. 10 are provided in the touch controller TP-IC. The other configurations are the same as FIG. 11, and the detailed description is omitted.

In the description above, the configuration is shown in which the output circuit OUC in the first scanning circuit SCAO1 and the output circuit OUC in the second scanning circuit SCAO2 drive the drive electrodes Tx1 to Txm from left and right sides, and it is not limited to it. A configuration may be provided in which the output circuit OUC in the first scanning circuit SCAO1 drives the odd-numbered drive electrodes (Tx1, Tx3, Tx5 . . . ) of the drive electrodes Tx1 to Txm and the output circuit OUC in the second scanning circuit SCAO2 drives the even-numbered drive electrodes (Tx2, Tx4, Tx6 . . . ) of the drive electrodes Tx1 to Txm. Thus, the number of the components of the output circuit OUC in the first scanning circuit SCAO1 can be decreased, and this enables a decrease in the area of the first scanning circuit SCAO1. Similarly, the number of the components of the output circuit OUC in the second scanning circuit SCAO2 can be decreased, and this enables a decrease in the area of the second scanning circuit SCAO2.

In the configuration, the power supply circuit PS is provided on the control substrate PCB, and it is not limited to it. The power supply circuit PS may be integrated into the touch controller TP-IC, or may be integrated into a display controller DDIC.

The touch controller TP-IC may be provided on the flexible printed board FPC2.

Exemplary Configuration 3

Figure 13:
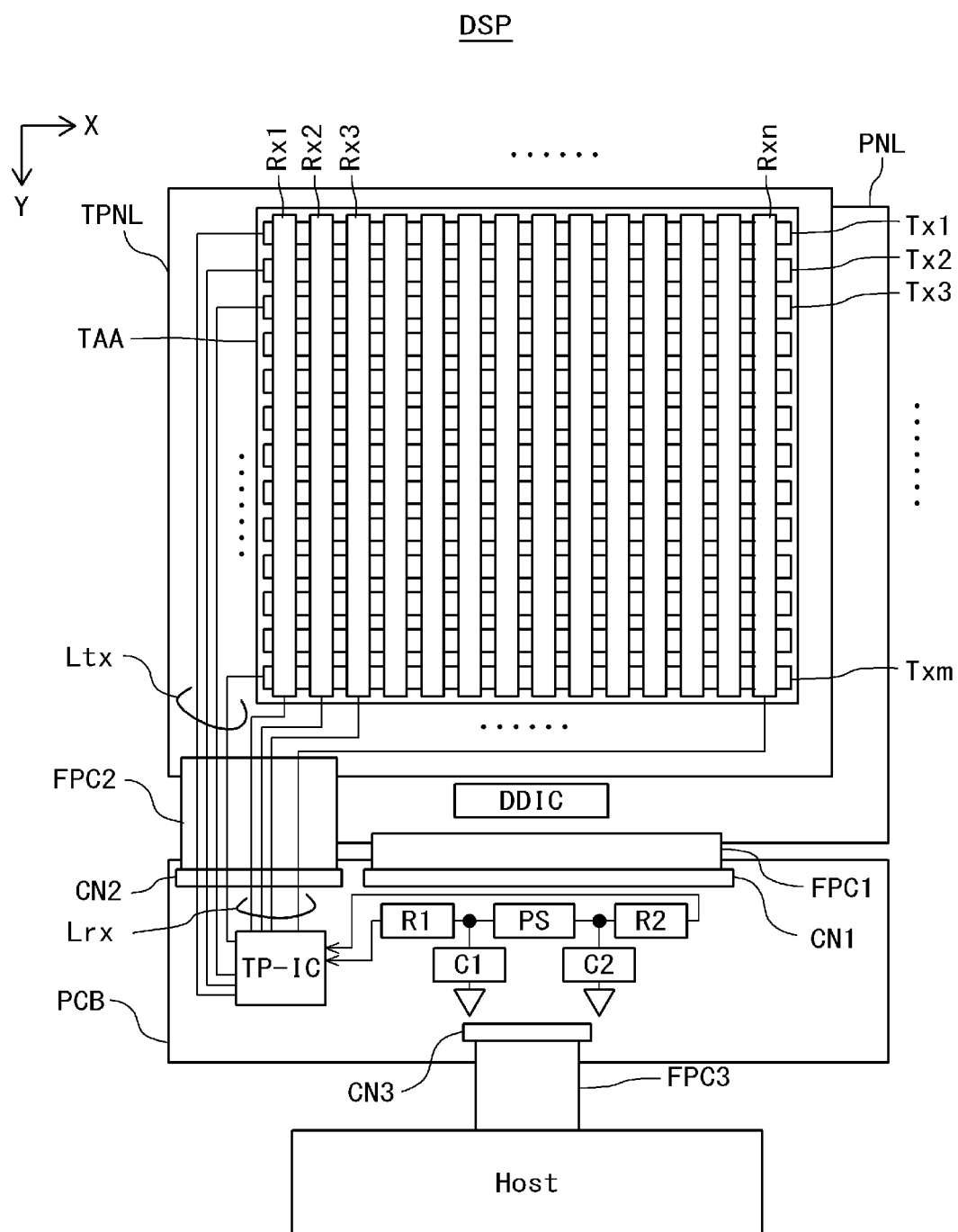
FIG. 13 is a diagram of a display device equipped with a sensor according to exemplary configuration 3.

FIG. 13 is a diagram of exemplary configuration 3 of the display device DSP equipped with a sensor according to the embodiment. In exemplary configuration 3, a display device DSP equipped with an on-cell type or an out-cell type touch sensor has a touch panel device (a touch panel) TPNL equipped with a touch sensor laid on the upper side of a display panel PNL including a plurality of pixels. Alternatively, the display panel PNL is laid on the lower side of the touch panel device (the touch panel) TPNL. FIG. 13 shows the touch panel TPNL and the display panel PNL that are slightly displaced with each other in the drawing for easy understanding.

In FIG. 13, the touch panel TPNL includes an active region TAA that is a touch detection region. In the active region TAA, drive electrodes Tx1, TX2 Txm disposed in parallel with each other extending in the X-direction and detection electrodes Rx1, Rx2 Rxn disposed in parallel with each other extending in the Y-direction are provided. Although not shown in FIG. 13, the display panel PNL includes an active region DAA that is a display region. In the active region DAA, display pixels PX disposed in a matrix configuration are provided. The active region TAA that is a touch detection region is laid on the active region DAA that is a display region. Thus, in the touch detection period, the position and coordinates of an object, such as a finger and a pen, on the active region TAA of the touch panel TPNL are detected at a touch controller TP-IC. The other configurations are the same as FIG. 11, and the detailed description is omitted.

Note that, in the configuration, a power supply circuit PS is provided on a control substrate PCB, and it is not limited to it. The power supply circuit PS may be integrated into the touch controller TP-IC, or may be integrated into a display controller DDIC.

The touch controller TP-IC may be provided on a flexible printed board FPC2.

Exemplary Configuration 4

Figure 14:
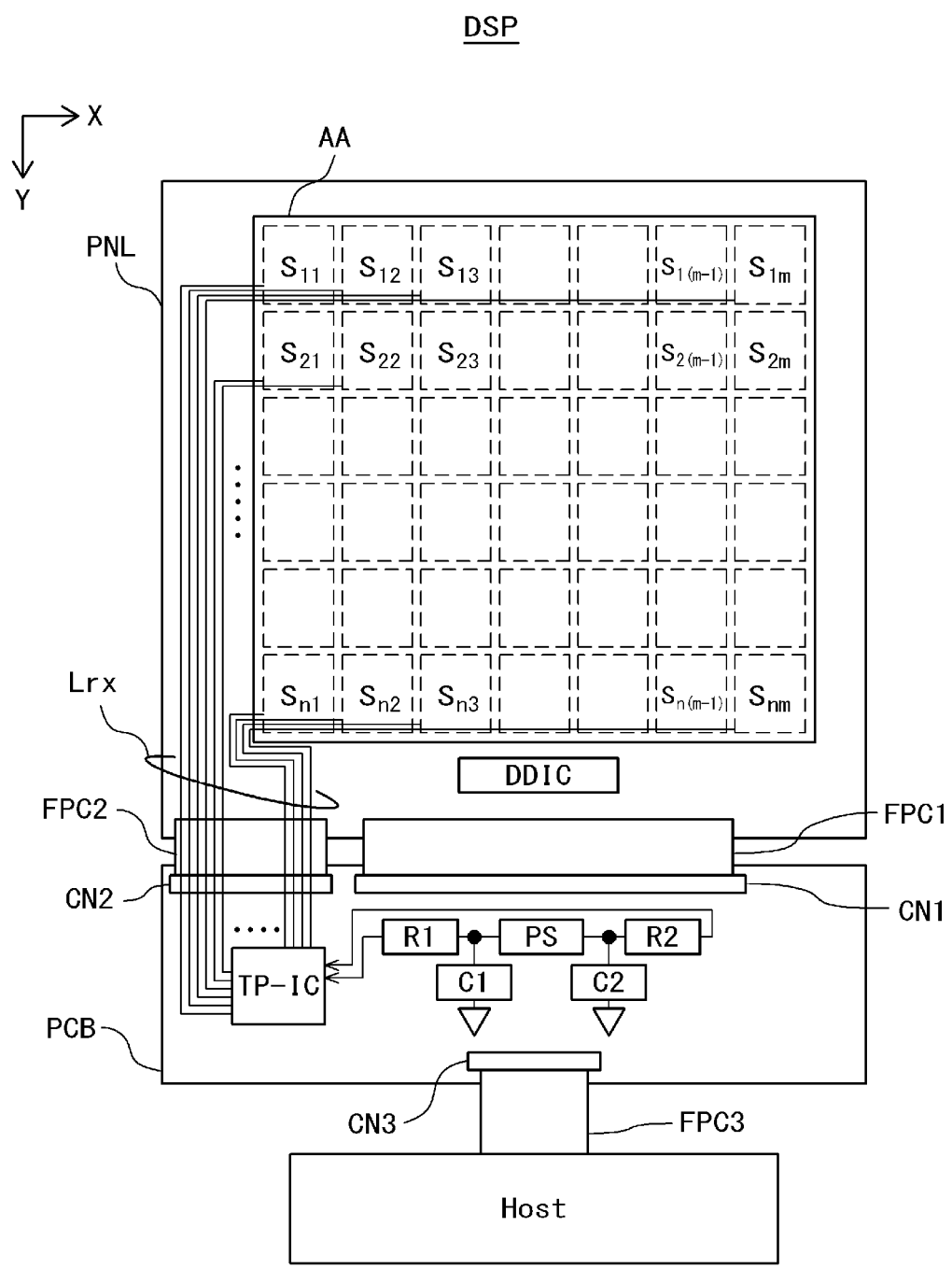
FIG. 14 is a diagram of a display device equipped with a sensor according to exemplary configuration 4.

FIG. 14 is a diagram of exemplary configuration 4 of the display device DSP equipped with a sensor according to the embodiment. Exemplary configuration 4 is another exemplary configuration of the in-cell type display device DSP equipped with a sensor.

The in-cell type display device DSP equipped with a sensor in FIG. 14 can be used for self capacitance sensing. Sensor detection electrodes (S11, S12, S13 . . . S1(m−1), S1m, S21, S22, S23 . . . S2(m−1), S2m, Sn1, Sn2, Sn3 . . . Sn(m−1), and Snm) are formed as separate electrodes in a matrix configuration disposed on an active region AA of a display panel PNL. Between the detection electrodes S11 to Snm and a touch controller TP-IC, connection wires Lrx connected to the detection electrodes S11 to Snm are provided. Detection signals from the detection electrodes S11 to Snm are inputted to an input circuit INC in the touch controller TP-IC through the connection wires Lrx. Thus, the touch position can be detected collectively or by time sharing in a plurality of groups. On the lower side of the active region AA, display pixels PX are disposed in a matrix configuration. Note that, on one detection electrode, the display pixels PX disposed in a matrix configuration are provided.

The display panel PNL is connected to a connector CN1 provided on a control substrate PCB through a flexible print circuit FPC1. The display panel PNL is connected to a connector CN2 provided on the control substrate PCB through a flexible printed board FPC2.

The control substrate PCB is provided with the touch controller TP-IC and with a power supply circuit PS, a first resistor element R1, a second resistor element R2, a first capacitive element C1, and a second capacitive element C2, which are described in FIG. 5 or FIG. 7. The touch controller TP-IC is supplied with the first and the second power supply potentials TPH and TPL generated at the power supply circuit PS through the first and the second resistor elements R1 and R2. In this example, the touch controller TP-IC includes a scanning circuit SCA and an output circuit OUC. The output circuit OUC is configured of output buffer circuits OB1 to OBm or CMOS analog switch circuits CSW1 to CSWm.

The outputs of the output circuit OUC in the touch controller TP-IC are connected to the detection electrodes S11 to Snm using connection wires Lrx through the flexible printed board FPC2. The detection electrodes S11 to Snm are connected to the input circuit INC provided in the touch controller TP-IC using connection wires Lrx through the flexible printed board FPC2 (see FIG. 8 or FIG. 10).

The control substrate PCB is provided with a connector CN3 and a flexible printed board FPC3 connected to the connector CN3. A host processor HOST is connected to the flexible printed board FPC3. The host processor HOST is connected to the touch controller TP-IC. In the touch detection period, the host processor HOST is supplied with a touch ID detected at the touch controller TP-IC and the coordinates of the touch ID, and executes a desired process based on the touch ID and the coordinates. The host processor HOST is connected to a display controller DDIC through the control substrate PCB, the connector CN1, and the flexible printed board FPC1. In the display period, for example, the host processor HOST supplies display data to the display controller DDIC.

Note that, FIG. 14 omits the resistor elements RR described in FIG. 8 for simplifying the drawing. The resistor elements RR in FIG. 8 are provided on the connection wires Lrx between the detection electrodes S11 to Snm and the input circuit INC. In the case of adopting the configuration in FIG. 10, the switching device RxSW and the third resistor element R3 in FIG. 10 is provided in the touch controller TP-IC.

In the configuration, the power supply circuit PS is provided on the control substrate PCB, and it is not limited to it. The power supply circuit PS may be integrated into the touch controller TP-IC, or may be integrated into the display controller DDIC.

The touch controller TP-IC may be provided on the flexible printed board FPC2.

Exemplary Configuration 5

Figure 15:
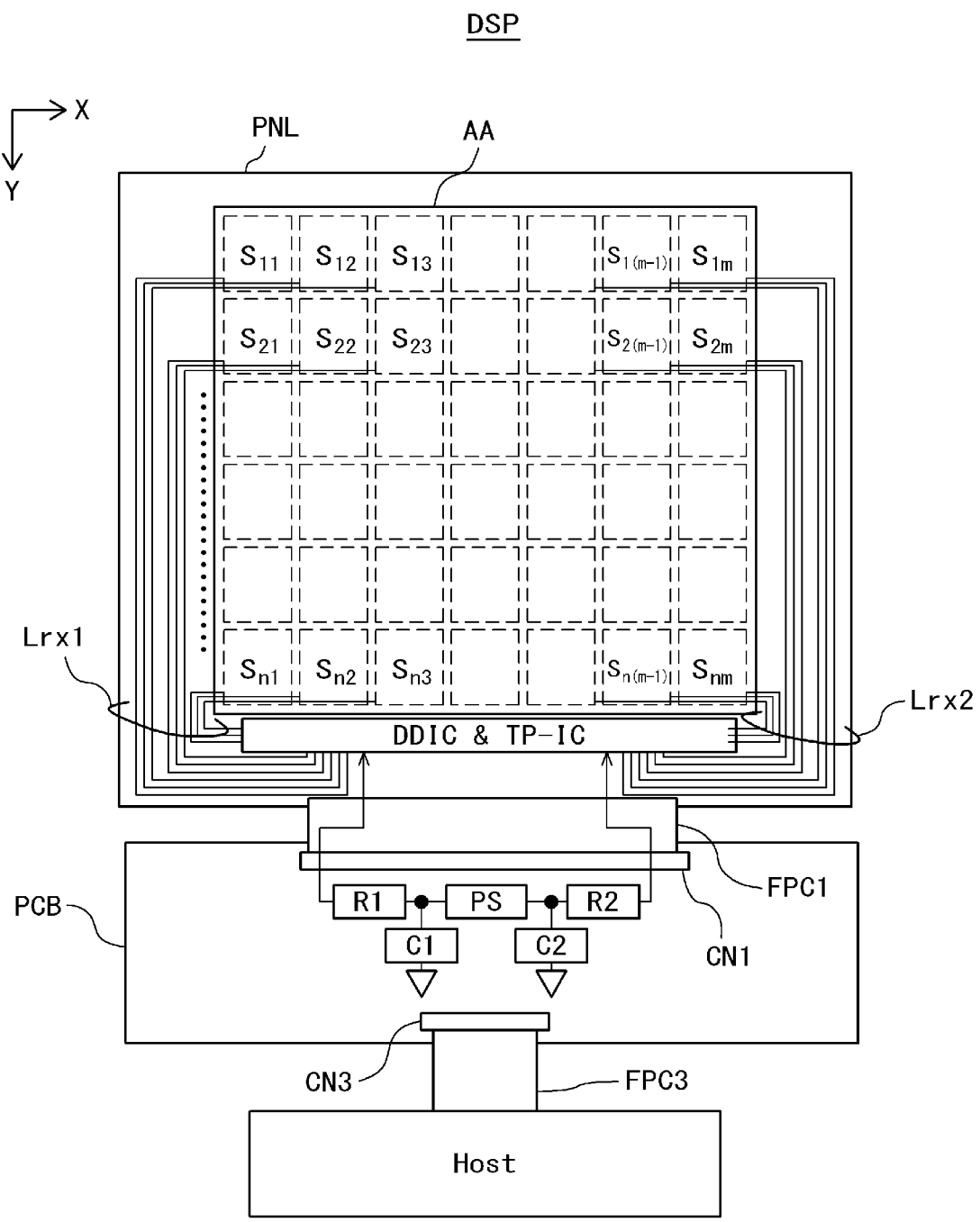
FIG. 15 is a diagram of a display device equipped with a sensor according to exemplary configuration 5.

FIG. 15 is a diagram of exemplary configuration 5 of the display device DSP equipped with a sensor according to the embodiment. Similarly to FIG. 14, exemplary configuration 5 shows an in-cell type display device DSP equipped with a touch sensor that can be used for self capacitance sensing. The difference between FIG. 14 and FIG. 15 is mainly two points below.

First, in FIG. 14, the display controller DDIC and the touch controller TP-IC are separately provided. In FIG. 15, a display controller DDIC and a touch controller TP-IC are configured as one semiconductor device (DDIC and TP-IC). Since the display controller DDIC and the touch controller TP-IC are provided as one semiconductor device (DDIC and TP-IC), the scanning circuit SCA and the output circuit OUC shown in FIG. 5 or FIG. 7 and the input circuit INC shown in FIG. 8 are provided in the semiconductor device (DDIC and TP-IC). The power supply circuit PS, the first and the second resistor elements R1 and R2, and the first and the second capacitive elements C1 and C2 described in FIG. 5 or FIG. 7 are provided on a control substrate PCB. The semiconductor device (DDIC and TP-IC) is supplied with the first and the second power supply potentials TPH and TPL generated at a power supply circuit PS through a first resistor element R1 and a second resistor element R2.

Subsequently, in FIG. 14, the connection wires Lrx are collectively provided between the left edge and the active region AA of the display panel PNL in the drawing. In FIG. 15, the connection wires Lrx are split into connection wires Lrx1 and connection wires Lrx2. In the drawing, the connection wires Lrx1 are provided between the left edge of the display panel PNL and the left edge of an active region AA. The connection wires Lrx2 are provided between the right edge of the display panel PNL and the right edge of the active region AA.

Note that, FIG. 15 omits the resistor elements RR described in FIG. 8 for simplifying the drawing. The resistor elements RR in FIG. 8 are provided on the connection wires Lrx1 and the connection wires Lrx2 between detection electrodes S11 to Snm and an input circuit INC. In the case of adopting the configuration in FIG. 10, the switching device RxSW and the third resistor element R3 in FIG. 10 are provided in the semiconductor device (DDIC and TP-IC). The other configurations are the same as FIG. 14, and the detailed description is omitted.

Note that, in the configuration, the power supply circuit PS is provided on the control substrate PCB, and it is not limited to it. The power supply circuit PS may be integrated into the semiconductor device (DDIC and TP-IC).

Exemplary Configuration 6

Figure 16:
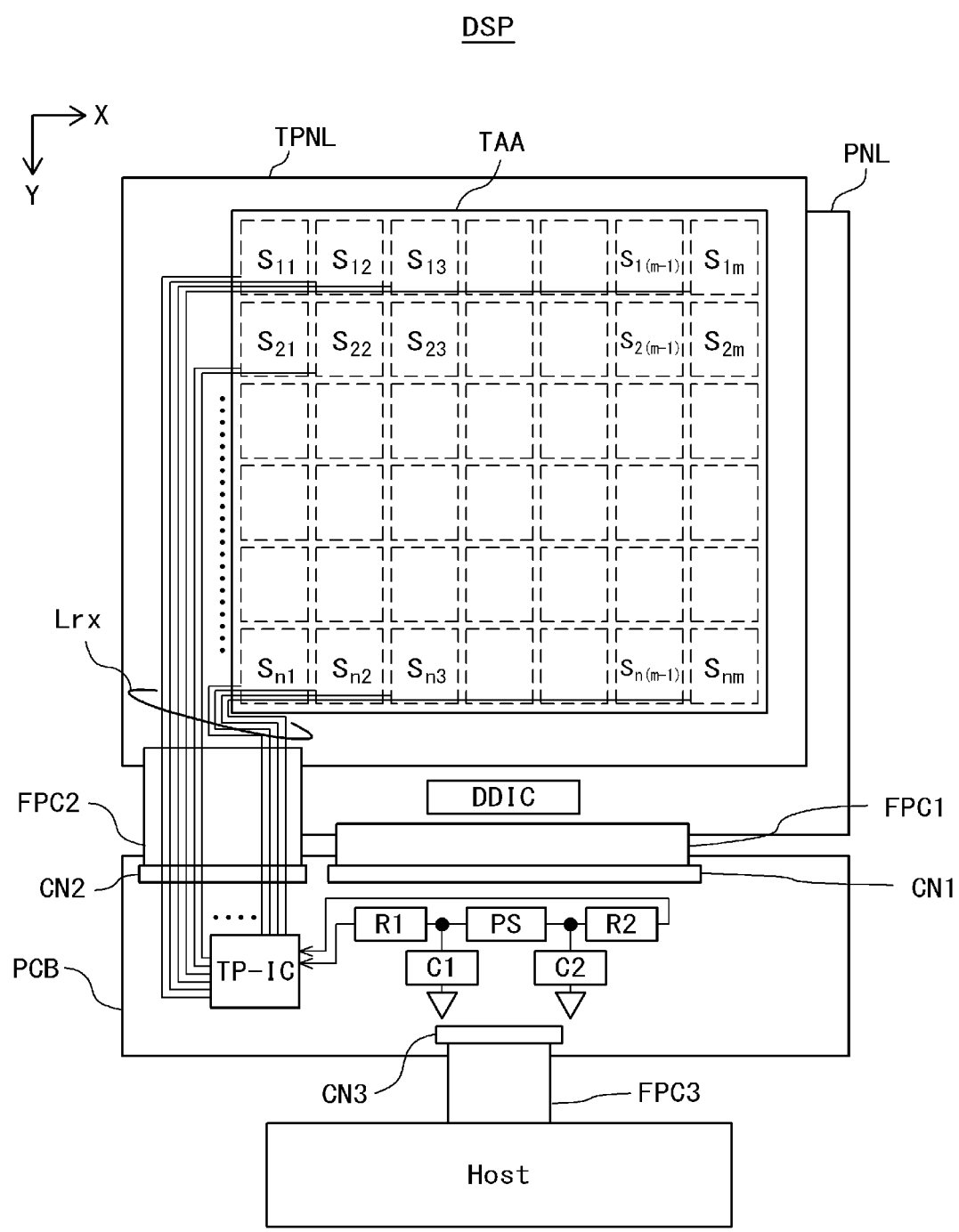
FIG. 16 is a diagram of a display device equipped with a sensor according to exemplary configuration 6.

FIG. 16 is a diagram of exemplary configuration 6 of the display device DSP equipped with a sensor according to the embodiment. Exemplary configuration 6 shows a display device DSP equipped with an on-cell type or an out-cell type touch sensor that can be used for self capacitance sensing.

In the display device DSP equipped with a sensor, a touch panel TPNL equipped with a touch sensor is laid on the upper side of a display panel PNL including a plurality of pixels. FIG. 16 shows the touch panel TPNL and the display panel PNL that are slightly displaced with each other in the drawing for easy understanding.

In FIG. 16, the touch panel TPNL includes an active region TAA that is a touch detection region. In the active region TAA, sensor detection electrodes (S11, S12, S13 ... S1(m−1), S1m, S21, S22, S23 ... S2(m−1), S2m, Sn1, Sn2, Sn3 ... Sn(m−1), and Snm) are formed as separate electrodes in a matrix configuration disposed on the active region (the touch detection region) TAA of the touch panel TPNL. In this case, detection signals from the detection electrodes S11 to Snm are extracted through connection wires Lrx, and a touch position can be immediately detected.

Although not shown in FIG. 16, the display panel PNL includes an active region DAA that is a display region. In the active region DAA, display pixels PX disposed in a matrix configuration are provided. The touch active region TAA is laid on the active region DAA that is a display region. Thus, in the touch detection period, the ID and coordinates of an object, such as a finger and a pen, on the touch active region TAA of the touch panel TPNL are detected at a touch controller TP-IC. The other configurations are the same as FIG. 14, and the detailed description is omitted.

Note that, in the configuration, a power supply circuit PS is provided on a control substrate PCB, and it is not limited to it. The power supply circuit PS may be integrated into the touch controller TP-IC, or may be integrated into a display controller DDIC.

The touch controller TP-IC may be provided on the flexible printed board FPC2.

Exemplary Arrangement of the Power Supply Circuit PS, the Resistor Elements R1 and R2, and the Capacitive Elements C1 and C2

Referring to FIGS. 17 to 21, exemplary arrangement 1 to exemplary arrangement 5 of the power supply circuit PS, the resistor elements R1 and R2, and the capacitive elements C1 and C2 will be described.

Exemplary Arrangement 1

Figure 17:
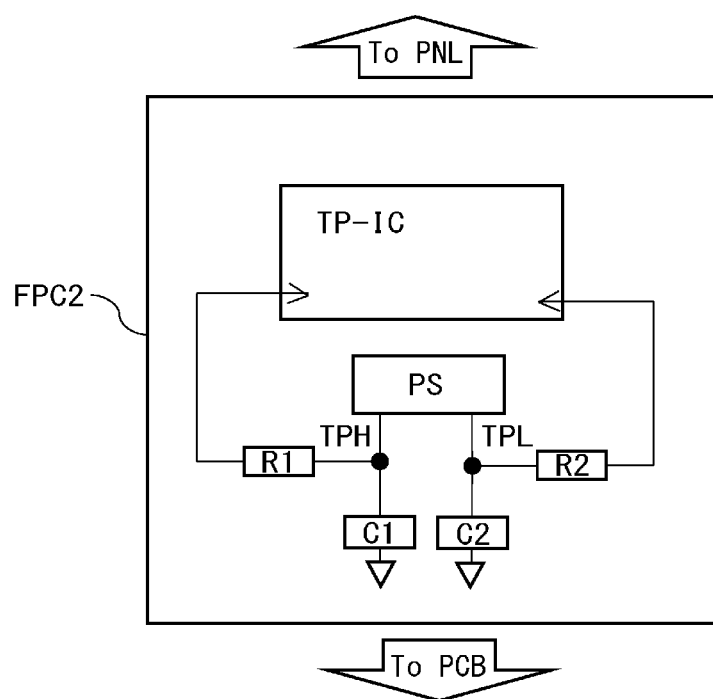
FIG. 17 is a diagram of the arrangement of a power supply circuit, resistor elements, and capacitive elements according to exemplary arrangement 1.

FIG. 17 shows exemplary arrangement 1. In FIG. 17, the upper side of the flexible printed board FPC2 is the display panel PNL side, and the lower side of the flexible printed board FPC2 is the control substrate PCB side, in a plan view. In exemplary arrangement 1, the touch controller TP-IC is disposed on the flexible printed board FPC2, and the power supply circuit PS, the resistor elements R1 and R2, and the capacitive elements C1 and C2 are similarly disposed on the flexible printed board FPC2. The first and the second power supply potentials TPH and TPL outputted from the power supply circuit PS are supplied to the touch controller TP-IC through the first and the second resistor elements R1 and R2.

Exemplary Arrangement 2

Figure 18:
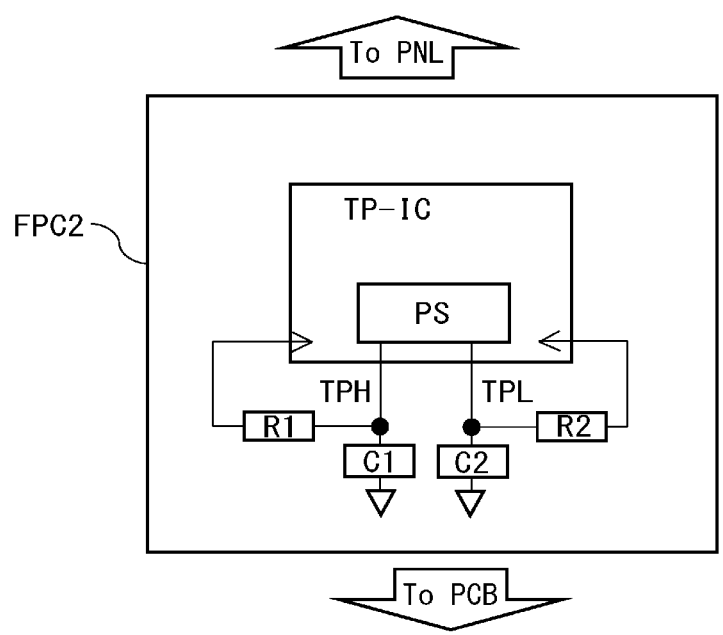
FIG. 18 is a diagram of the arrangement of a power supply circuit, resistor elements, and capacitive elements according to exemplary arrangement 2.

FIG. 18 shows exemplary arrangement 2. In FIG. 18, the upper side of the flexible printed board FPC2 is the display panel PNL side, and the lower side of the flexible printed board FPC2 is the control substrate PCB side, in a plan view. In exemplary arrangement 2, the touch controller TP-IC that integrates the power supply circuit PS is disposed on the flexible printed board FPC2, and the resistor elements R1 and R2 and the capacitive elements C1 and C2 are similarly disposed on the flexible printed board FPC2. The first and the second power supply potentials TPH and TPL outputted from the power supply circuit PS are supplied to the touch controller TP-IC through the first and the second resistor elements R1 and R2.

Exemplary Arrangement 3

FIG. 19 shows exemplary arrangement 3. In FIG. 19, the upper side of the flexible printed board FPC1 is connected to the display panel PNL, and the lower side of the flexible printed board FPC1 is the control substrate PCB side, in a plan view. In exemplary arrangement 3, the display controller DDIC, the touch controller TP-IC, and the power supply circuit PS are configured as one semiconductor device (DDIC and TP-IC), the semiconductor device (DDIC and TP-IC) is disposed on the display panel PNL, and the resistor elements R1 and R2 and the capacitive elements C1 and C2 are disposed on the flexible printed board FPC1. The first and the second power supply potentials TPH and TPL outputted from the power supply circuit PS are supplied to the semiconductor device (DDIC and TP-IC) through the first and the second resistor elements R1 and R2.

Exemplary Arrangement 4

Figure 20:
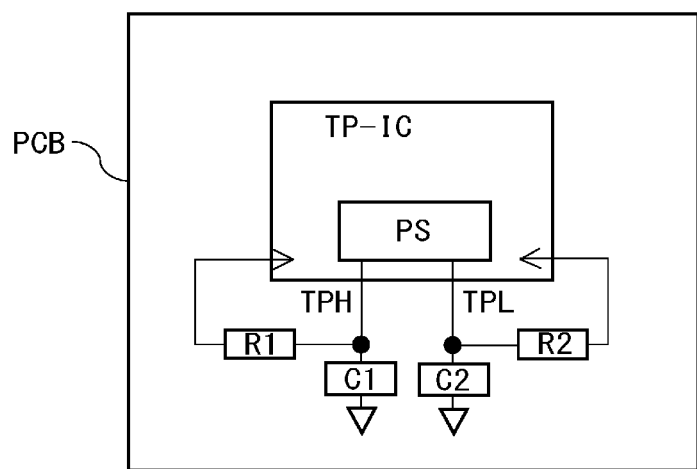
FIG. 20 is a diagram of the arrangement of a power supply circuit, resistor elements, and capacitive elements according to exemplary arrangement 4.

FIG. 20 shows exemplary arrangement 4. In exemplary arrangement 4, the touch controller TP-IC that integrates the power supply circuit PS is disposed on the control substrate PCB, and the resistor elements R1 and R2 and the capacitive elements C1 and C2 are similarly disposed on the control substrate PCB. The first and the second power supply potentials TPH and TPL outputted from the power supply circuit PS are supplied to the touch controller TP-IC through the first and the second resistor elements R1 and R2.

Exemplary Arrangement 5

Figure 21:
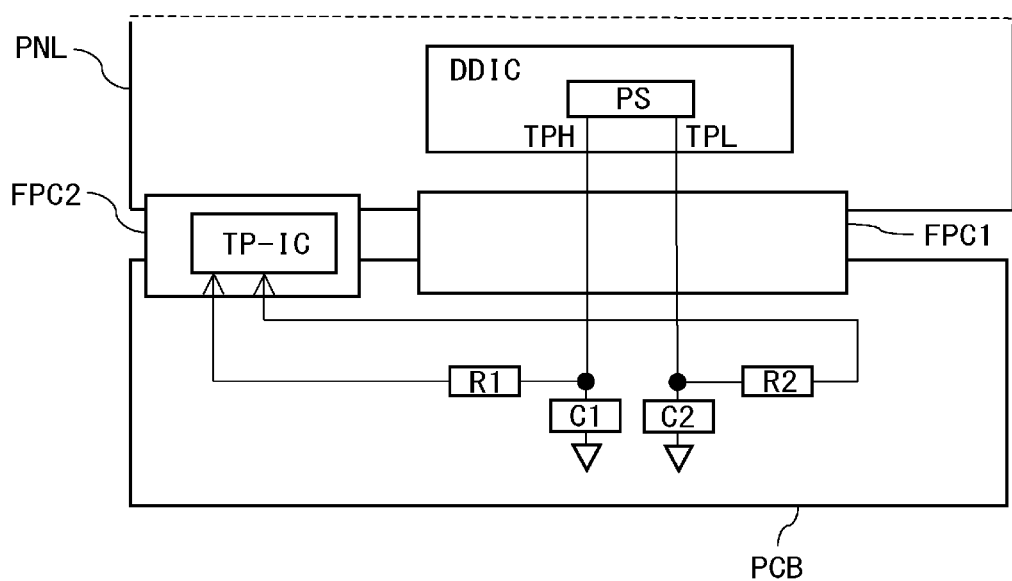
FIG. 21 is a diagram of the arrangement of a power supply circuit, resistor elements, and capacitive elements according to exemplary arrangement 5.

FIG. 21 shows exemplary arrangement 5. In exemplary arrangement 5, the display controller DDIC that integrates the power supply circuit PS is disposed on the display panel PNL, the touch controller TP-IC is disposed on the flexible printed board FPC2, and the resistor elements R1 and R2 and the capacitive elements C1 and C2 are disposed on the control substrate PCB. The first and the second power supply potentials TPH and TPL outputted from the power supply circuit PS are supplied to the touch controller TP-IC disposed on the flexible printed board FPC2 through the first and the second resistor elements R1 and R2 disposed on the control substrate PCB via the flexible printed board FPC1.

All the display devices that can be embodied by a person skilled in the art who appropriately modifies and alters design based on the display devices described as the embodiment of the present invention belong to the scope of the present invention as long as these all the display devices include the gist of the present invention.

In the scope of the idea according to the present invention, a person skilled in the art can easily conceive various modifications and alternations. These modifications and alternations are interpreted to belong to the scope of the present invention. For example, ones that a component is appropriately added, removed, or changed in design on the foregoing embodiments, or ones that a process is added, omitted, or changed in the conditions by a person skilled in the art are also included in the scope of the present invention as long as they include the gist of the present invention.

The other effects derived from the modes described in the embodiment that are apparent from the specification or that can be appropriately conceived by a person skilled in the art are of course obtained from the present invention.

Various inventions can be formed by appropriate combinations of the components disclosed in the forgoing embodiment. For example, some components may be removed from all the components shown in the embodiment. Furthermore, the components in another embodiment may be appropriately combined.

What is claimed is:

1. A touch panel driving circuit comprising: a plurality of output circuits each outputting a driving signal, respectively; power supply lines connected to power potentials of the plurality of output circuits; power supply circuits; and resistor elements that are provided in common for the plurality of output circuits and is different from a resistance of the power supply lines, wherein a corresponding one of the power potentials of the plurality of output circuits is connected to a corresponding one of the power supply circuits through a corresponding one of the resistor elements and a corresponding one of the power supply lines;

wherein the power potentials of the plurality of output circuits includes a first power potential and a second power potential lower than the first power potential, wherein the power supply circuits includes a first power supply circuit and a second power supply circuit, wherein the power supply lines include a first power supply line through which the first power potential is supplied to the plurality of output circuits and a second power supply line through which the second power potential is supplied to the plurality of output circuits, wherein the resistor elements include a first resistor element which is provided in common for the plurality of output circuits and which is different from a resistance of the first power supply line and a second resistor element which is provided in common for the plurality of output circuits and which is different from a resistance of the second power supply line, wherein the first power supply circuit outputs the first power potential to the first power supply line through the first resistor element, and wherein the second power supply circuit outputs the second power potential to the second power supply line through the second resistor element.

2. The touch panel driving circuit according to claim 1, wherein the plurality of output circuits are connected to a plurality of drive electrodes, respectively.

3. The touch panel driving circuit according to claim 1, wherein each of the plurality of output circuits is configured of a buffer circuit.

4. The touch panel driving circuit according to claim 1, wherein each of the plurality of output circuits is configured of a switch circuit.

5. The touch panel driving circuit according to claim 1, wherein the plurality of output circuits and the resistor elements are disposed on a flexible substrate that is connected to a display panel.

6. The touch panel driving circuit according to claim 1, further comprising: a plurality of capacitors connected to the power supply lines between the resistor elements and the power supply circuits.

7. The touch panel driving circuit according to claim 1, further comprising: a first capacitor connected to the first power supply line between the first resistor element and the first power supply circuit; and a second capacitor connected to the second power supply line between the second resistor element and the second power supply circuit.

* * * * *